(12) United States Patent
Takeda et al.

(10) Patent No.: US 10,630,774 B2
(45) Date of Patent: Apr. 21, 2020

(54) INTRA-FORMATION NETWORK SYSTEM, INTRA-FORMATION NETWORK MANAGEMENT METHOD, AND MANAGEMENT APPARATUS

(71) Applicant: Hitachi Kokusai Electric Inc., Tokyo (JP)

(72) Inventors: Takashi Takeda, Tokyo (JP); Kiyoshi Iyori, Tokyo (JP); Tetsuya Ito, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 110 days.

(21) Appl. No.: 15/124,502

(22) PCT Filed: Mar. 13, 2015

(86) PCT No.: PCT/JP2015/057507
§ 371 (c)(1),
(2) Date: Sep. 8, 2016

(87) PCT Pub. No.: WO2015/146641
PCT Pub. Date: Oct. 1, 2015

(65) Prior Publication Data
US 2017/0019481 A1    Jan. 19, 2017

(30) Foreign Application Priority Data

Mar. 27, 2014    (JP) ................ 2014-065868

(51) Int. Cl.
*H04L 29/08*    (2006.01)
*H04L 12/24*    (2006.01)
(Continued)

(52) U.S. Cl.
CPC ........ *H04L 67/12* (2013.01); *H04L 12/40019* (2013.01); *H04L 12/44* (2013.01);
(Continued)

(58) Field of Classification Search
None
See application file for complete search history.

(56) References Cited

U.S. PATENT DOCUMENTS 9,154,900 B1 * 10/2015 Addepalli ............. H04W 4/046
9,503,324 B2 * 11/2016 Smith ................. H04L 41/0816
(Continued)

FOREIGN PATENT DOCUMENTS

GB    2508743 A    6/2014
JP    2006-311139 A    11/2006
(Continued)

OTHER PUBLICATIONS

International Search Report dated May 26, 2015.

*Primary Examiner* — Noel R Beharry
*Assistant Examiner* — Rodrick Mak
(74) *Attorney, Agent, or Firm* — Bacon & Thomas, PLLC

(57) ABSTRACT

It is assumed that some railway vehicles each include a control device and other railway vehicles include no control devices and that one or more control devices may be included in a train information. If only one control device is included in the train formation, there is no problem. However, if two or more control devices are included therein, it means that multiple control systems exist therein, so that it is necessary to determine a control system consistently. When a train is activated and started for operations or when railway vehicles are coupled together or divided, a management server, which has the smallest IP address value assigned, for example, by a DHCP and which exhibits the highest processing speed, controls, as a main management server, all of such systems. Even if any trouble occurs in a network or in a network device, the management system is automatically reconstituted.

20 Claims, 16 Drawing Sheets

(51) Int. Cl.
*H04L 12/44* (2006.01)
*H04L 12/46* (2006.01)
*H04L 12/40* (2006.01)

(52) U.S. Cl.
CPC ...... H04L 12/4641 (2013.01); H04L 41/0873 (2013.01); H04L 41/0893 (2013.01); *B60L 2200/26* (2013.01)

(56) References Cited

U.S. PATENT DOCUMENTS

| | | | | |
|---|---|---|---|---|
| 2006/0268744 | A1* | 11/2006 | Sakai | H04W 8/005 370/254 |
| 2009/0079560 | A1* | 3/2009 | Fries | B61L 27/0088 340/539.22 |
| 2011/0149743 | A1* | 6/2011 | Agarwal | H04L 41/0677 370/242 |
| 2013/0151032 | A1* | 6/2013 | Kraeling | H04L 45/74 701/1 |
| 2014/0336851 | A1* | 11/2014 | Kadono | H04L 41/0853 701/19 |
| 2015/0223118 | A1* | 8/2015 | Bisti | H04W 40/36 370/331 |
| 2015/0281652 | A1* | 10/2015 | Morimoto | B61L 23/00 348/148 |
| 2017/0187545 | A1* | 6/2017 | Ogawa | H04L 12/2881 |

FOREIGN PATENT DOCUMENTS

| | | |
|---|---|---|
| JP | 2013-025523 A | 2/2013 |
| JP | 2013-255177 A | 12/2013 |
| WO | 2013/114543 A1 | 8/2013 |

* cited by examiner

INTRA-FORMATION NETWORK SYSTEM, INTRA-FORMATION NETWORK MANAGEMENT METHOD, AND MANAGEMENT APPARATUS

FIELD OF THE INVENTION

The present invention relates to communication between network devices installed in a railway vehicle or the like; and more particularly, to multiplexing and switching operation of a control apparatus for managing a system.

BACKGROUND OF THE INVENTION

Recently, in public transportation units such as buses, taxies, railway vehicles represented by a train, or the like, a monitoring system including monitoring cameras or the like operates inside and/or outside a vehicle. Further, it is general to monitor and record (store) a state inside a vehicle by using images in order to prevent crime, nuisance or the like inside a vehicle. The introduction of the monitoring system into the railway vehicle makes it possible to monitor the inside of the train by the monitoring camera and also possible to record or store the image of the inside of the train.

For example, there is disclosed a system that allows information such as images or the like to be communicated between vehicles by a network switch installed in each vehicle and determines a congestion rate of each vehicle based on images captured by the monitoring camera installed in each vehicle (see Japanese Patent Application Publication No. 2013-025523).

In the above-described system, the communication between vehicles is realized by the monitoring network in which network monitoring devices installed in respective vehicles are connected via network switches and generally a control apparatus for controlling the monitoring network is installed. A train formation may include a plurality of vehicles such as a driver cabin, a passenger cabin and the like connected to each other. The respective vehicles may require different network devices. In that case, the control apparatus may be installed only in some vehicles and. Further, one or more control apparatuses may be installed in one train formation. If only one control apparatus is installed in the train formation, there is no problem. However, if two or more control apparatuses are installed in the train formation, it means that multiple control systems exist therein, so that it is necessary to consistently determine a control system uniformly.

SUMMARY OF THE INVENTION

In view of the above, the present invention provides a system capable of stably controlling or managing an intra-formation network regardless of types of train formation of a railway vehicle.

In accordance with aspects, there are provided an intra-formation network system and an intra-formation network management method in an intra-formation network system of a train formation including one or more vehicles. The intra-formation network system includes network devices and at least one management apparatus. The at least one management apparatus is connected to the network devices through a network and configured to control the network devices. The at least one management apparatus obtains first information on an intra-formation network and determines whether or not the at least one management apparatus itself is a main management apparatus based on the first information. The management apparatus determined as the main management apparatus controls the network devices.

The intra-formation network includes an upper layer network configured to operate the train formation and a lower layer network including the network devices. The upper layer network and the lower layer network are connected via the at least one management apparatus. The at least one management apparatus obtains the first information from the upper layer network.

The network devices transmit state information thereof to the at least one management apparatus. When receiving the state information of the network devices, the at least one management apparatus combines the state information of the network devices and transmits the combined state information as second information to the upper layer network.

The at least one main management apparatus transmits management information required for operations of the network devices to the network devices based on the first information.

The at least one management apparatus determines whether or not the at least one management apparatus has received the management information from another management apparatus after the intra-formation network system is activated. When the at least one management apparatus has not received the management information, the at least one management apparatus controls the network devices as the main management apparatus.

When the at least one management apparatus includes two or more management apparatuses, a management apparatus other than the main management apparatus serves as a sub-management apparatus. wherein when the second information to be transmitted from the main management apparatus to the sub-management apparatus is not received for a predetermined period of time or when information indicating abnormality of the main management apparatus is included in the second information transmitted from the main management apparatus to the sub-management apparatus, the sub-management apparatus and the main management apparatus switch their roles so that the sub-management apparatus becomes to serve as the main management apparatus and the main management apparatus becomes to serve as the sub-management apparatus.

When the at least one management apparatus includes two or more management apparatuses, a management apparatus other than the main management apparatus serves as a sub-management apparatus. When the second information transmitted from the main management apparatus to the sub-management apparatus includes information indicating that some of the network devices transmit the state information and remaining devices of the network devices do not transmit the state information, the sub-management apparatus changes its role so that the sub-management apparatus becomes to serve as the main management apparatus.

In accordance with further another aspect, there is provided a management apparatus for managing network devices installed in an intra-formation network system of a train formation including one or more vehicles. The management apparatus obtains first information on the intra-formation network, and determines whether or not the management apparatus itself is a main management apparatus based on the first information. The management apparatus controls the network devices when it is determined as the main management apparatus.

The management apparatus is connected to an upper layer network configured to operate the train formation and a lower layer network including the network devices. The upper layer network and the lower layer network are parts of the intra-formation network. The management apparatus obtains the first information from the upper layer network.

The management apparatus transmits management information required for operations of the network devices to the network devices based on the first information when it is determined as the main management apparatus.

The management apparatus determines whether or not the management apparatus has received the management information from another management apparatus after the intra-formation network system is activated. When the management apparatus has not received the management information, the management apparatus controls the network devices as the main management apparatus.

The management apparatus serves as a sub-management apparatus when it is not determined as the main management apparatus. When the management apparatus does not receive second information including the state information of the network devices to be transmitted from the main management apparatus within a predetermined period of time or receives information, which is included in the second information transmitted from the main management apparatus, indicating abnormality of the main management apparatus, the sub-management apparatus changes its role to serve as the main management apparatus.

The management apparatus serves as a sub-management apparatus when it is not determined as the main management apparatus. When the sub-management apparatus receives second information including the state information of the network devices transmitted from the main management apparatus to the sub-management apparatus, the second information including information indicating that some of the network devices transmit the state information and remaining devices of the network devices do not transmit the state information, the sub-management apparatus changes its role to serve as the main management apparatus.

Effect of the Invention

As described above, the system of the present invention is capable of stably controlling or managing the intra-formation network regardless of types of train formation of the railway vehicle.

DETAILED DESCRIPTION OF THE EMBODIMENTS

Hereinafter, embodiments will be described with reference to the accompanying drawings. In the present invention, a vehicle denotes a single vehicle constituting a train formation; a train denotes vehicles which are connected each other; and a train formation denotes a type of actual operation of a single or a plurality of vehicles.

First Embodiment

In a first embodiment, there will be described construction, control and management of an intra-formation network in the case of activating and operating a train. In the first embodiment, an example in which two management servers exist in a train formation will be described. However, the same process can be performed when a single or a plurality of management servers exists in the train formation.

Figure 1:
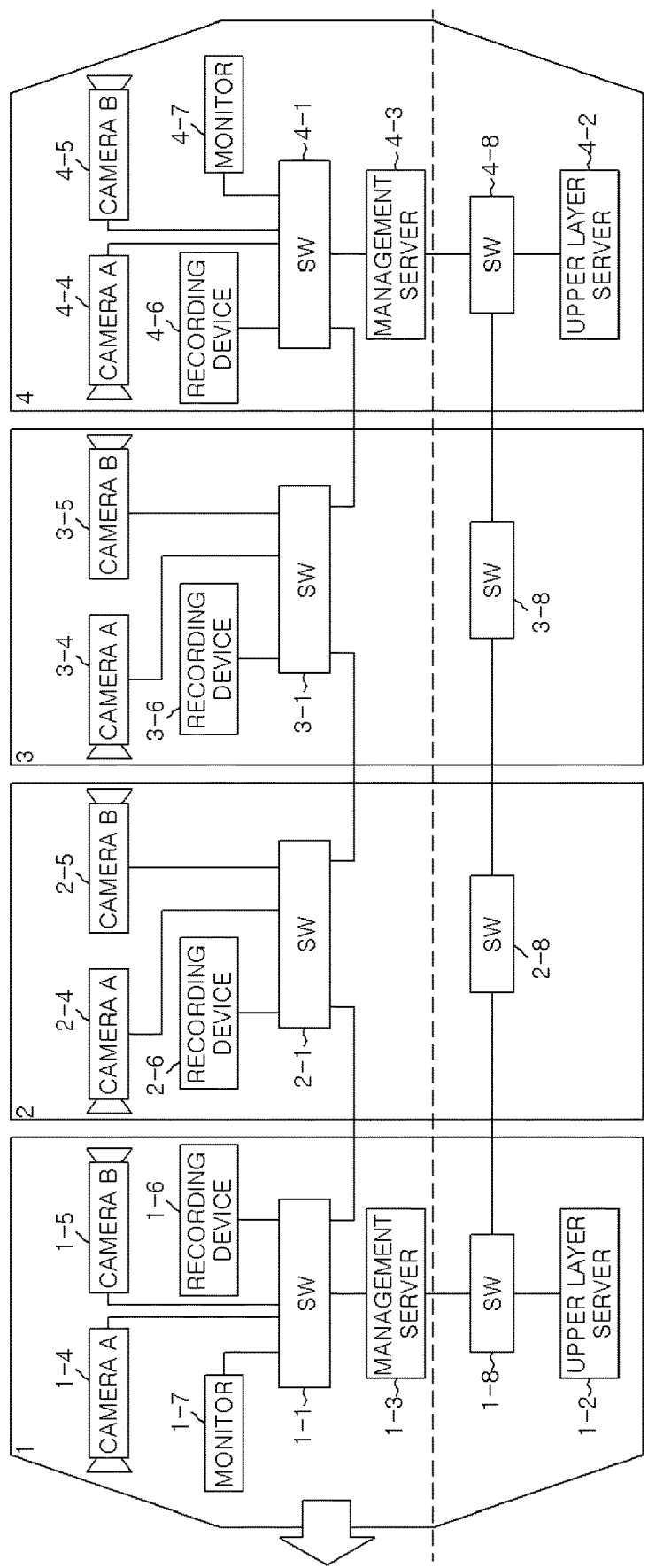
FIG. 1 shows an exemplary configuration of an intra-formation network according to a first embodiment.

FIG. 1 shows an exemplary configuration of an intra-formation network according to the first embodiment.

In FIG. 1, reference numerals 1 to 4 denote vehicles that constitute a train of one train formation. An arrow direction in FIG. 1 is set to a travelling direction. Reference numerals 1-1, 2-1, 3-1 and 4-1 denote network switches configured to connect network devices thereby to connect monitoring networks between vehicles. Reference numerals 1-2 and 4-2 denote upper layer servers for managing operation of the train. Reference numerals 1-3 and 4-3 denote management servers for controlling the network devices in the train formation. Reference numerals 1-4, 2-4, 3-4 and 4-4 denote cameras A for capturing images near a right door in the traveling direction of the vehicle. Reference numerals 1-5, 2-5, 3-5 and 4-5 denote cameras B for capturing images near a left door in the travelling direction of the vehicle. Reference numerals 1-6, 2-6, 3-6 and 4-6 denote recording devices for recording images captured by the cameras of the respective vehicles. Reference numerals 1-7 and 4-7 denote monitors for displaying images in the train formation or the like. Reference numerals 1-8, 2-8, 3-8 and 4-8 denote network switches for connecting upper layer networks between vehicles, the network switches being connected by a network such as LAN (Local Area Network) or the like. Here, the images captured by the camera A(4) or B(5) are displayed on the monitor 1-7 installed in the leading vehicle 1 in the travelling direction. However, the images may be displayed on the monitor 4-7 of the rear vehicle 4. An L2 switch, a switching hub, a router or the like may be used as the network switch as long as it has a packet transmission function and a SNMP (Simple Network Management Protocol) client function.

In the drawing, the reference numerals of the network devices are expressed in the form of "device title+vehicle number+device number". When it is necessary to distinguish the network devices on a vehicle basis, the expression "device title+vehicle number+device number" is used. When it is unnecessary to distinguish the network devices, the expression "device title+device number" is used. For example, a camera A that is distinguished on a vehicle basis is expressed by a camera A(1-4, 2-4, 3-4, 4-4) and a camera A that is not distinguished on a vehicle basis is expressed by a camera A(4).

Especially, the vehicles 1 and 4 having driver cabins include the network switches 1-1 and 4-1, the upper layer servers 1-2 and 4-2, the management servers 1-3 and 4-3, the cameras A(1-4) and A(4-4), the cameras B(1-5) and B(5-5), the recording devices 1-6 and 4-6, the monitors 1-7 and 4-7, and the network switches 1-8 and 4-8, respectively. In the monitoring network, the network devices are connected through the network switches 1-1 and 4-1. In the upper layer networks, the upper layer servers 1-2 and 4-2 and the management servers 1-3 and 4-3 are connected through the network switches 1-8 and 4-8. The vehicles 2 and 3 without driver cabins include the network switches 2-1 and 3-1, the cameras A(2-4) and A(3-4), the cameras B(2-5) and B(3-5), the recording devices 2-6 and 3-6, and the network switches 2-8 and 3-8, respectively. In the monitoring network, the network devices are connected through the network switches 1-1 and 4-1. In the upper layer network, the devices of the adjacent vehicles are connected through the network switches 2-8 and 3-8. The intra-formation network is constructed by connecting the network switches 1 and by connecting the network switches 8 between adjacent vehicles. The upper layer server 2 and the management server 3 are installed in the leading vehicle and the rear vehicle, respectively. One of the upper layer servers and one of the management servers serves as a main server and the other serves as a sub-server. Basically, the main server controls and manages the network devices and the sub-server does not control the devices. The determination of the main server and the operation of the management server 3 will be described later. In the present embodiment, the upper layer server 1-2 and the management server 1-3 serve as the main servers.

In the present embodiment, the network including the cameras above the dotted line is set to the monitoring network and the network including the upper layer server below the dotted line is set to the upper layer network. The upper layer network is a network for the entire system of the railway vehicle. The monitoring network is a network for the monitoring system using the images of the railway vehicle. The upper layer network and the monitoring network are divided by a subnet mask and connected through the management server. In other words, the management server 3 has a port of the monitoring network side and a port of the upper layer network side and manages both networks separately by a VLAN (Virtual Local Area Network). The communication between the upper layer network and the monitoring network is performed by the management servers 3. Devices mainly for a vehicle operation (not shown) including the upper layer server 2 and the management server 3 are connected to the upper layer network. Image monitoring devices including the management server 3, the network switch 1, the cameras A(4) and B(5), the recording device 6, and the monitor 7 are connected to the monitoring network.

First, a method for managing an intra-formation monitoring network in the cases of activating and operating a train, especially, a method for determining a main management server and a sub-management server, will be described with reference to FIG. 2.

Figure 2:
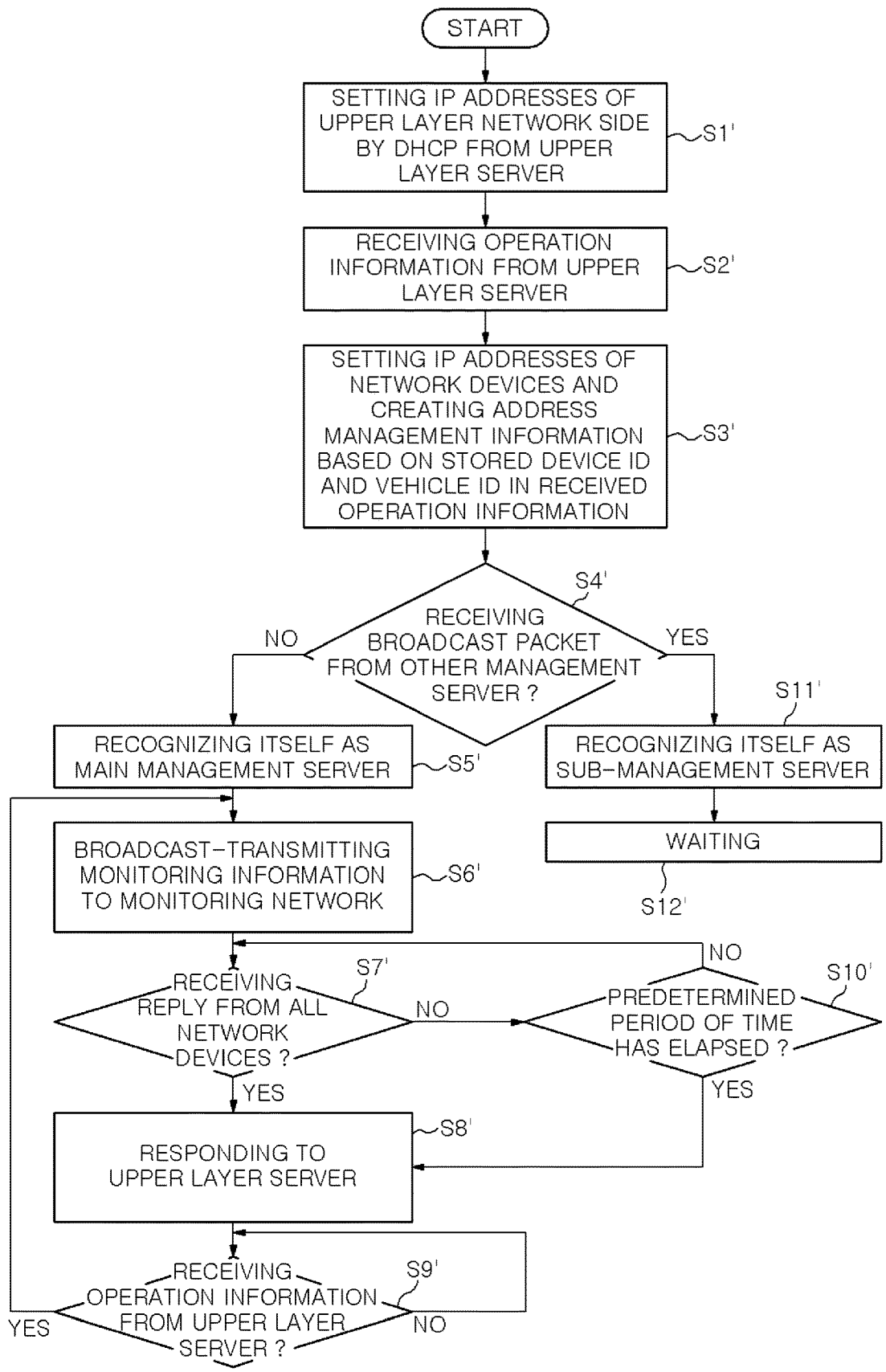
FIG. 2 is an exemplary flowchart showing a method of managing an intra-formation monitoring network in the case of activating and operating a train.

FIG. 2 is a flowchart showing the intra-formation monitoring network management method of the management server in the case of activating and operating the train.

When the power of the train is ON, the power is supplied to the respective network devices in the train and the train is activated (activation). First, the upper layer network starts preparation of the devices for operation. In this procedure, the upper layer server 1-2 serving as the main server assigns IP addresses of the upper layer network side to the management servers 1-3 and 4-3 by using a DHCP (Dynamic Host Configuration Protocol) (S1). Next, the upper layer server 1-2 notifies by multicast the management servers 1-3 and 4-3 of the operation information (S2).

In the present embodiment, the operation information includes information on a vehicle ID, a leading vehicle (travelling direction), a speed, a current position, door opening/closing, a connection flag, a separation flag, or the like. The vehicle ID is combination of the number of digits indicating types of powers of vehicles, types of vehicles, the number of vehicles of a train formation, a vehicle number and the like.

The management information includes time or position information that is metadata recorded together with images or information such as a vehicle number of the like. Further, the management information may include a flag indicating that the source management server 3 is a main server, or the like.

The management servers 1-3 and 4-3 analyze a vehicle ID in the received operation information based on the previously stored information of the vehicle ID, obtain IP addresses of the network devices while referring to the previously stored information of devices on a vehicle type basis, and create an address management table that is a management table of the network devices (S3).

The management servers 1-3 and 4-3 determine whether or not the management information has been received by broadcast from the other management servers 3 (S4). When the management information has not been received (No), the management servers 1-3 and 4-3 are recognized as main management servers (S5) and the management information created based on the operation information is transmitted through broadcast to the monitoring network (S6). On the contrary, when the management information has been received (Yes), the management servers 1-3 and 4-3 are recognized as sub-management servers (S11) and made to wait (S12).

Upon completion of the setting of the IP addresses of the network devices, the management servers 1-3 and 4-3 transmit by broadcast the management information packet including the IP addresses thereof to the network devices of the monitoring network (S6). In the present embodiment, the management server 1-3 having IP address with a low value and a highest processing speed transmits by broadcast the management information, so that the management server 1-3 serves as a main server and the management server 4-3 serves a sub-server.

When receiving the management information packet of the broadcast packet from the main management server 103, the network devices such as the cameras A(4) and B(5), the management server 4-3, the recording device 6, and the monitor 7 register transmission source ID address information in the corresponding packet as destination information and reply the state information thereof to the main management server 1-3. The reply may be performed by, e.g., Trap of SNMP or the like.

The main management server 1-3 determines whether or not the reply has been received from all the network devices (S7). When the reply has been received from all the network devices (Yes), the main management server 1-3 transmits by multicast the state information of the network devices to the upper layer server 1-2 (S8). Then, the main management server 1-3 determines whether or not the operation information has been received from the upper layer server (S9). When the operation information is being received (Yes), the process proceeds to S6. When the operation information is not being received (No), S9 is repeated until the operation information is received. When it is determined in S7 that the reply is not being received from all the network devices (No), the process proceeds to S10 to determine whether or not a predetermined period of time has elapsed (S10). When the predetermined period of time has elapsed (Yes), it is considered that there is no reply and the process proceeds to S8 to reply to the upper layer server 1-2. When the predetermined period of time has not elapsed (No), the process proceeds to S7 and the reply from an unresponsive network device is waited.

Accordingly, the network devices in the train formation can communicate in the monitoring network. When the state in which the communication can be performed is ensured in the monitoring network, the management server 1-3 notifies the upper layer server 1-2 of the corresponding state. Further, when the preparation of the system in the train other than the monitoring network is completed, the operation of the train is started (operation).

In the upper layer network, the upper layer server 2 and the management server 3 communicate with each other by multicast. In the monitoring network, the management server 1-3 serving as the main server transmits the management information by broadcast. Therefore, in the upper layer network, the multicast packet transmitted from the upper layer server 2 reaches both of the main management server 1-3 and the sub-management server 4-3, and the multicast packet transmitted from the main management server 1-3 reaches the upper layer server 2 and the sub-management server 4-3. In the monitoring network, the broadcast packet transmitted from the main management server 1-3 reaches the sub-management server 4-3, and the sub-management server 4-3 as one of the network devices replies the state information thereof to the main management server 1-3. In order to avoid confusion in management, the reply to the upper layer server 2 is transmitted only from the management server 1-3 serving as the main server.

When the management information is transmitted by broadcast from the main management server 1-3, the network devices reply the state information thereof to the main management server 1-3. The state information may be replied directly to the main management server 1-3. Or, in consideration of the congestion of the network, the cameras A(4) and B(5) may transmit the state information to the recording device 6, the recording device 6 may combine the state information of the cameras A(4) and B(5) and transmit the state information thereof to the network switch 1, and the network switch 1 may combine the state information of the cameras A(4) and B(5) and the recording device 6 and send the state information to the main management server 1-3.

Depending on types of combination of vehicles, a single management server may exist in the train formation, or three or more management servers may exist in the train formation. However, according to the above-described disclosure, the unified system management can be performed regardless of the types of combination of vehicles.

Hereinafter, operations of the respective devices during a normal operation of a train will be described.

When the train starts operation in a travelling direction, the upper layer server 1-2 transmits the operation information to the management servers 1-3 and 4-3 at a regular interval. The main management server 1-3 transmits the management information to the network devices based on the operation information. The network devices directly or indirectly transmit the state information thereof, as a reply to the management information, to the main management server 1-3 by using Trap of SNMP. The main management server 1-3 replies to the upper layer server 1-2 based on the Trap of the network devices.

The main management server 1-3 controls the network devices based on the operation information. When a train reaches a station and passengers get on and off, the main management server 1-3 controls the recording device 6 to start or stop recording of the images captured by the cameras A(4) and B(5) based on the door opening/closing information in the operation information received from the upper layer server 1-2. When a door is opened based on the received door opening/closing information, the recording device 6 starts recording of the images captured by the camera A or B. When a door is closed, the recording of the images captured by the camera A or B is stopped after a predetermined period of time elapses from the door closing. For example, when a right door is opened, the recording device 6 starts recording of images captured by the camera A(4) installed in the same vehicle under the control of the management server. When a right door is closed, the recording of the images captured by the camera A(4) is stopped after 30 seconds.

The management server 1-3 controls ON/OFF of display of the images captured by the camera A(4) or B(5) on the monitor 1-7 based on the speed information and the door opening/closing information received from the upper layer server 1-2. When the speed is lower than a predetermined value and the door is opened, the monitor 1-7 starts the display of the images captured by the camera A or B based on the speed information and the door opening/closing information. When the speed is higher than the predetermined value, the monitor 1-7 stops the display of the images captured by the camera A or B. For example, when the speed is lower than 5 km/h and a left door is opened, the monitor 1-7 starts the display of the images captured by the camera B(5) under the control of the management server. When the speed is higher than 5 km/h, the monitor 1-7 stops the display of the images captured by the camera B(5).

Figure 3:
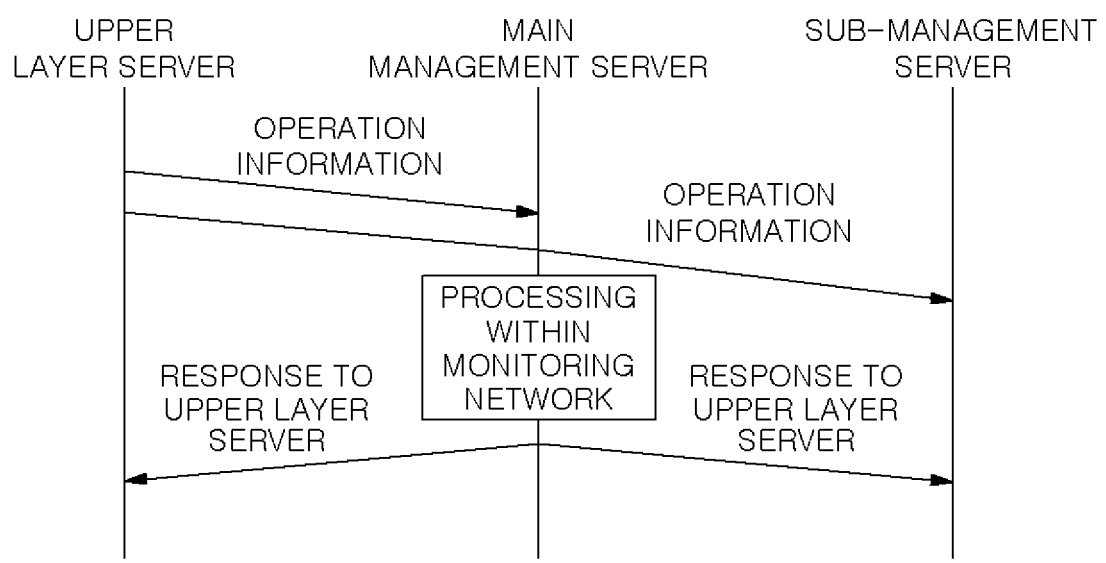
FIG. 3 shows signal exchange in an upper layer network in a normal state.
Figure 4:
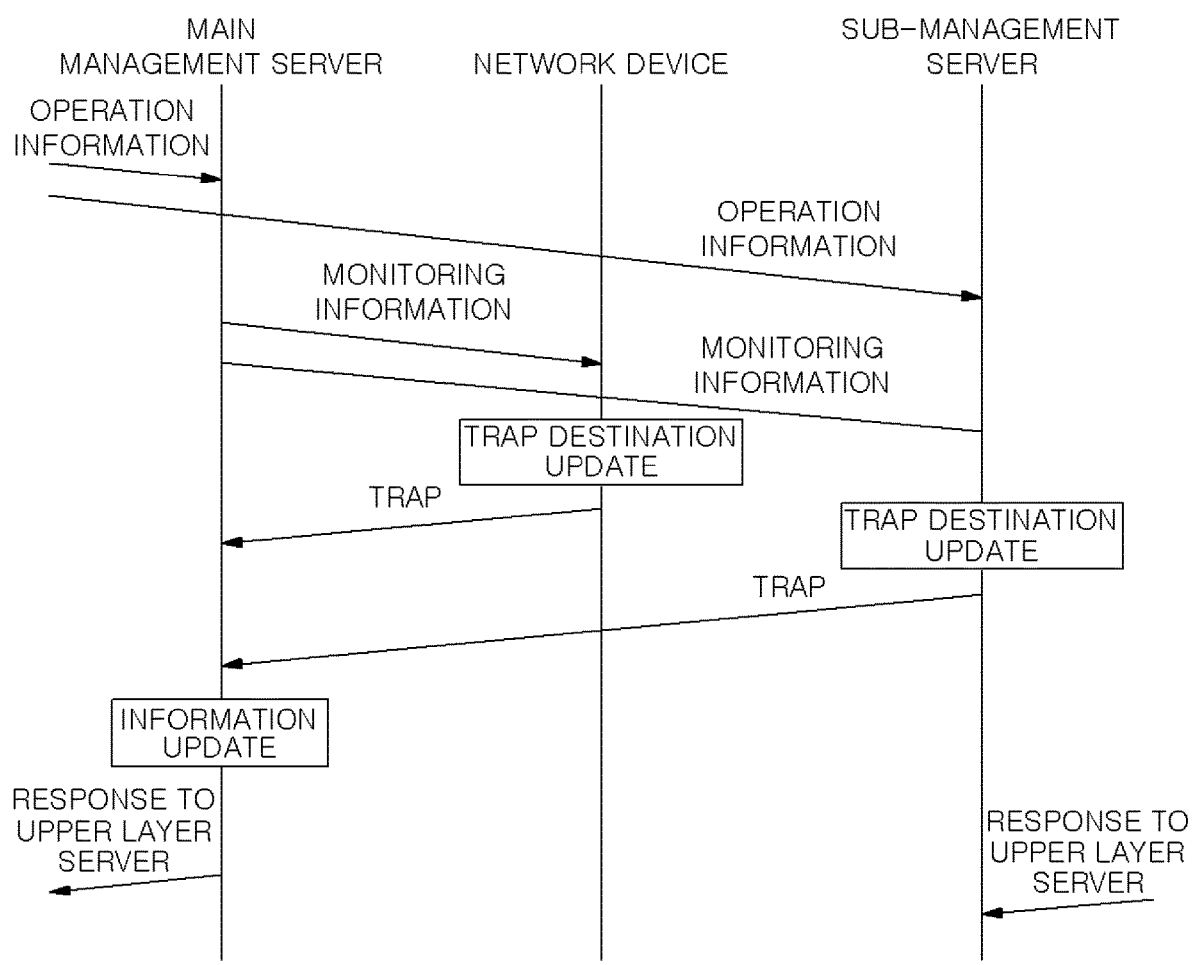
FIG. 4 shows signal exchange in a monitoring network in a normal state.
Figure 5:
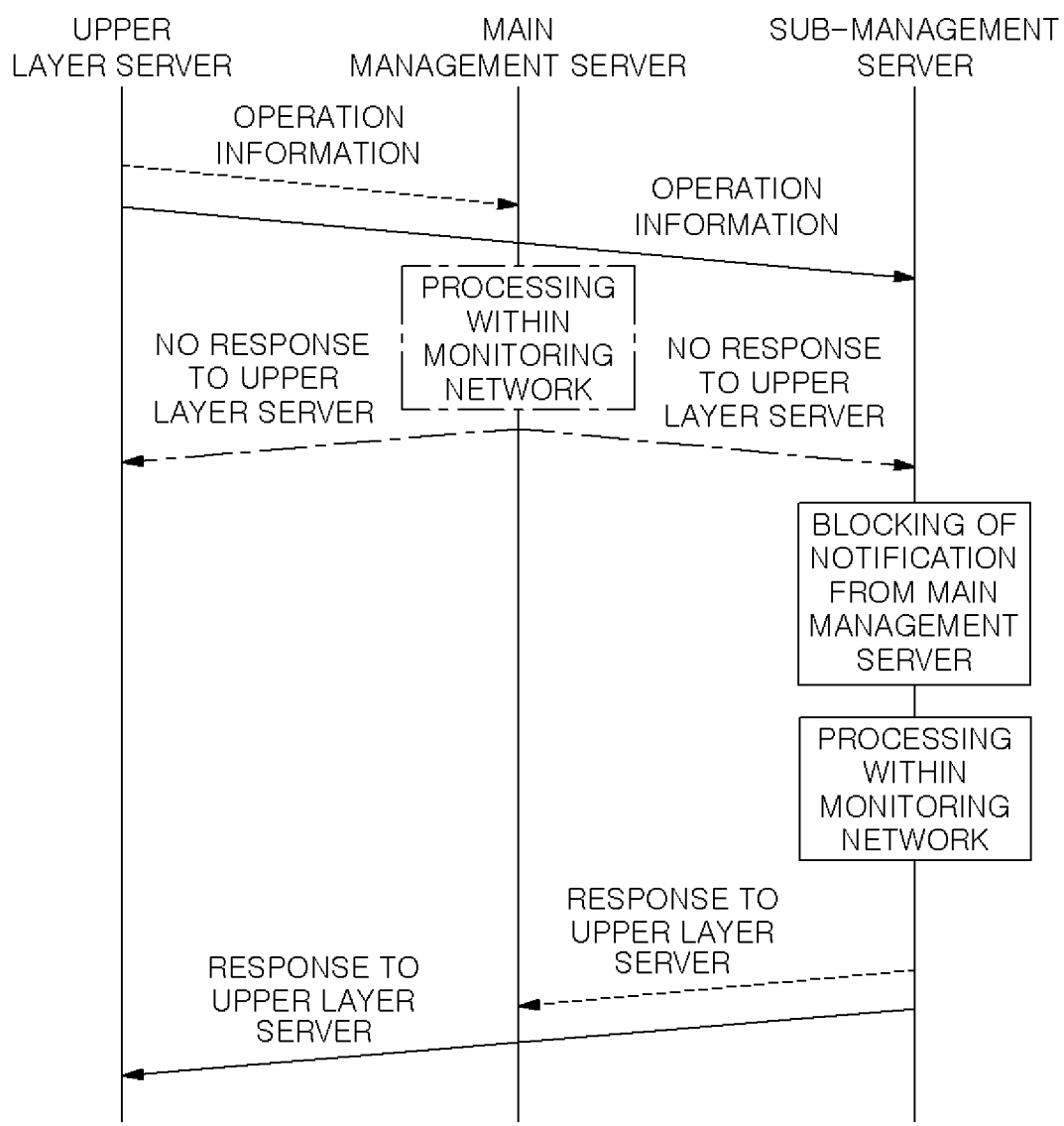
FIG. 5 shows signal exchange in the upper layer network in a state where a power of a main management server is stopped.
Figure 6:
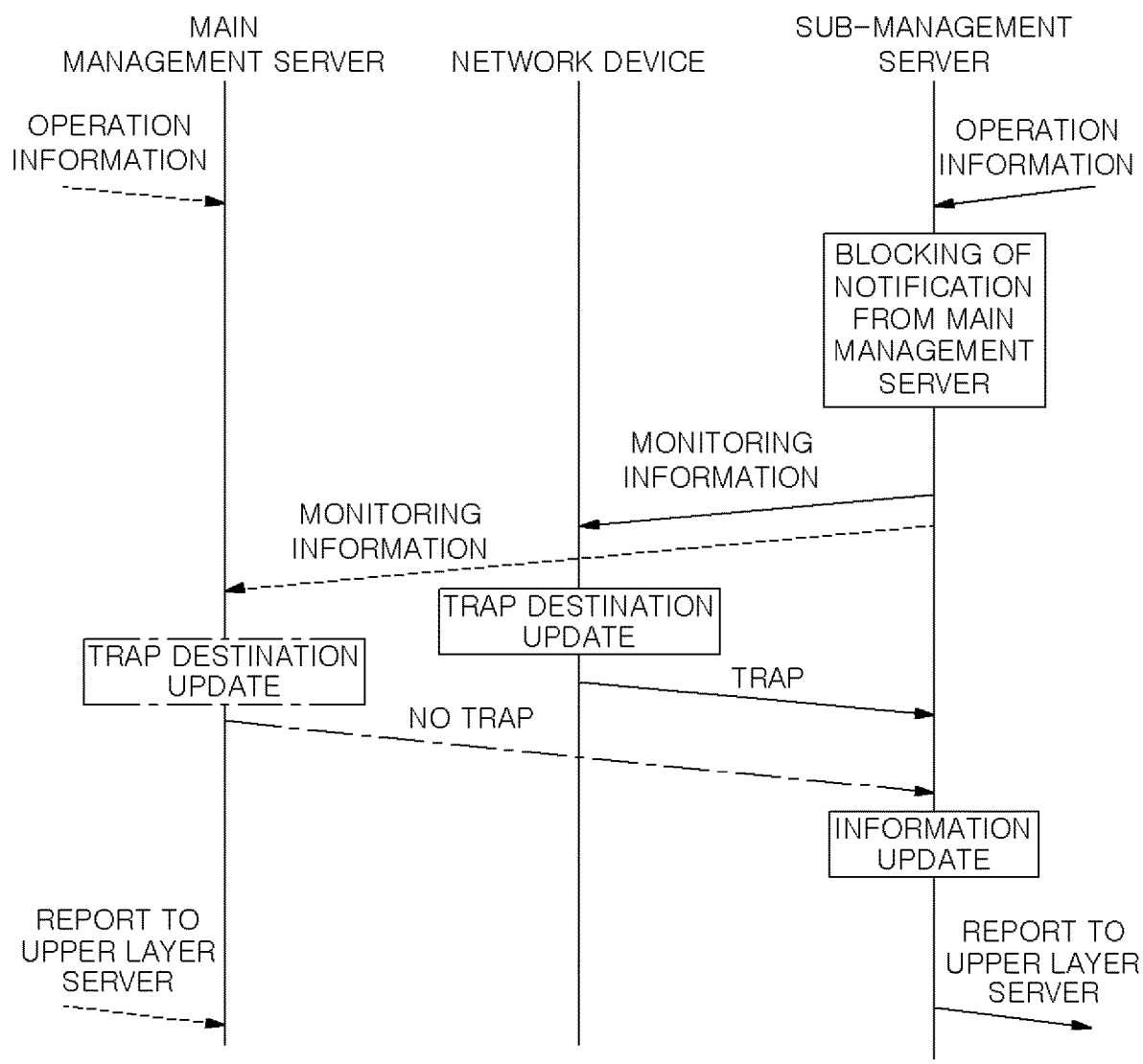
FIG. 6 shows signal exchange in the monitoring network in a state where power of the main management server is stopped.
Figure 7:
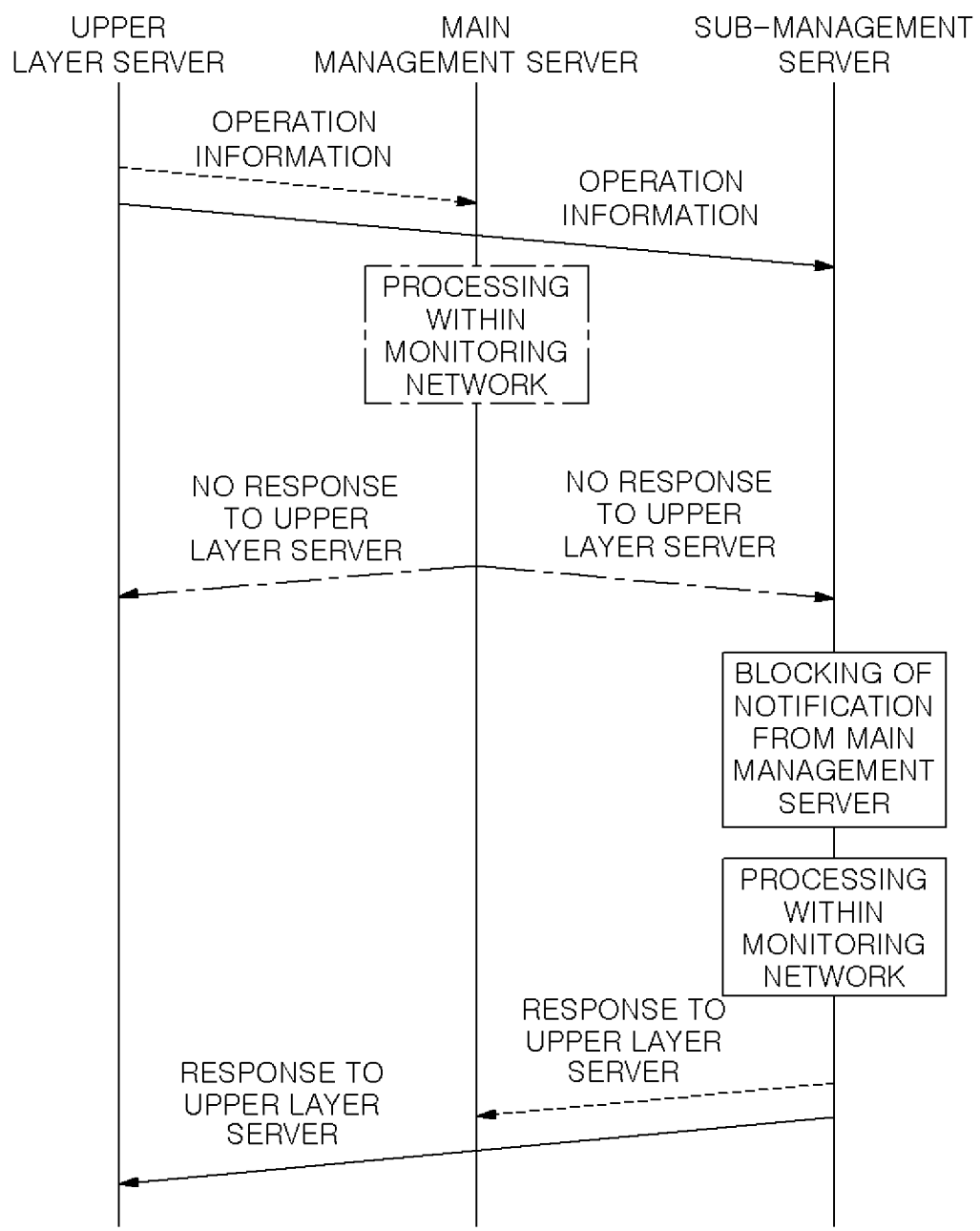
FIG. 7 shows signal exchange in the upper layer network in a state where the main management server in the upper layer network is isolated.
Figure 8:
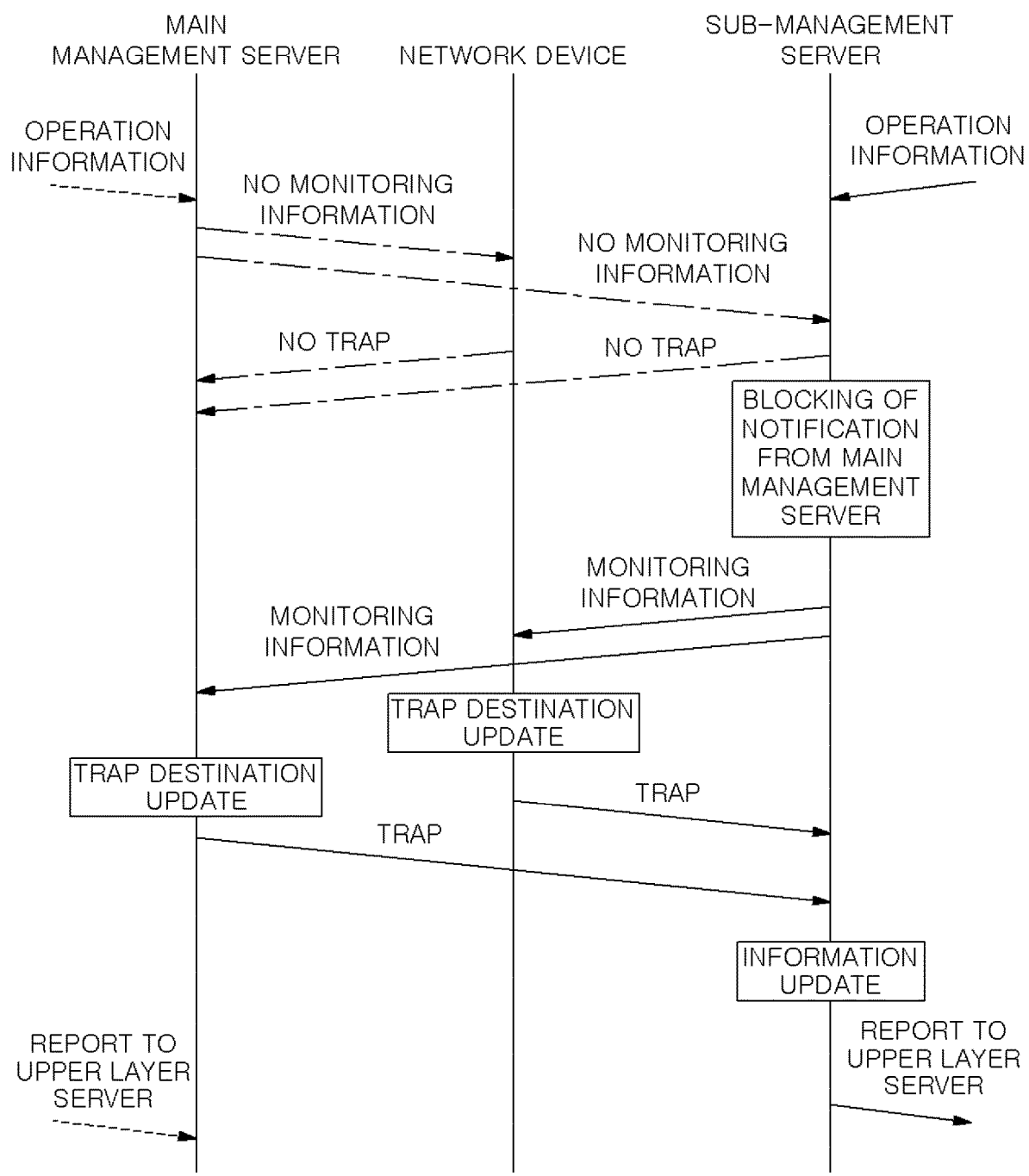
FIG. 8 shows signal exchange in the monitoring network in a state where the main management server in the upper layer network is isolated.
Figure 9:
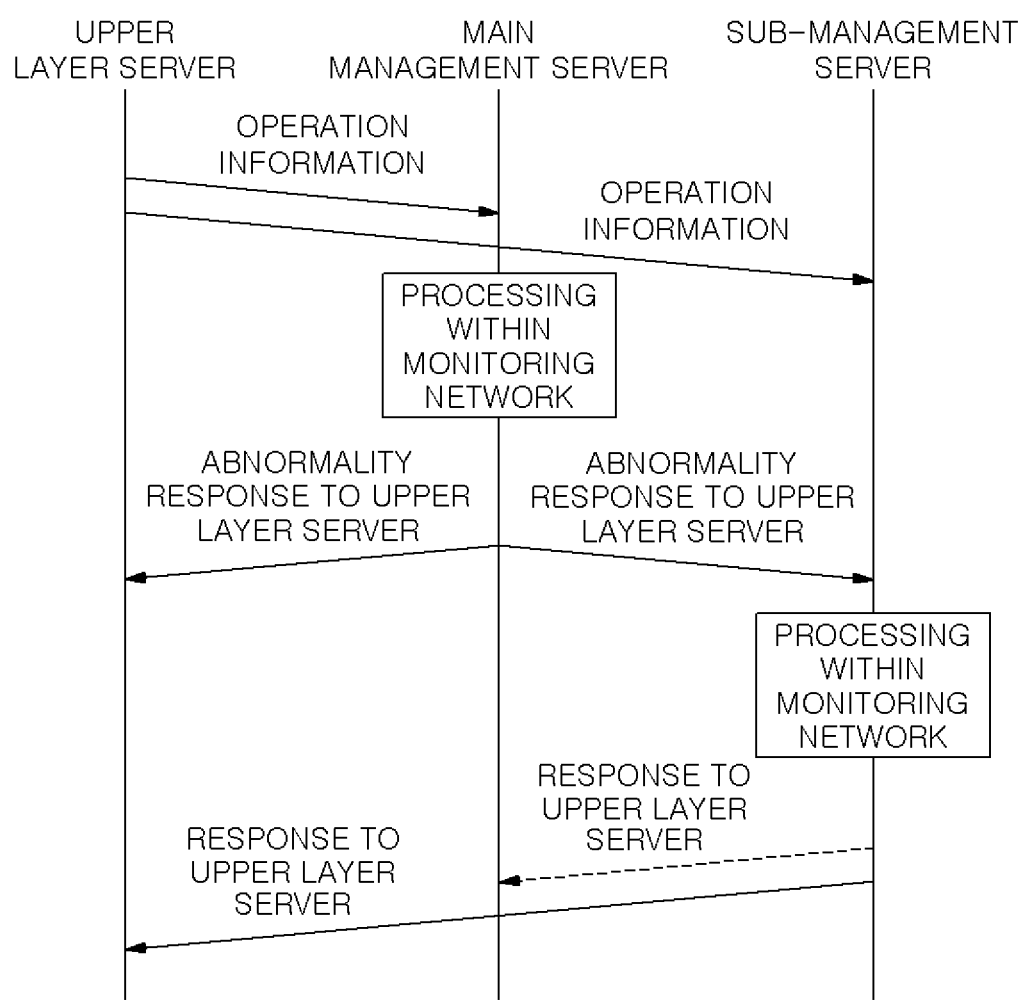
FIG. 9 shows signal exchange in the upper layer network in a state where the main management server in the monitoring network is isolated.
Figure 10:
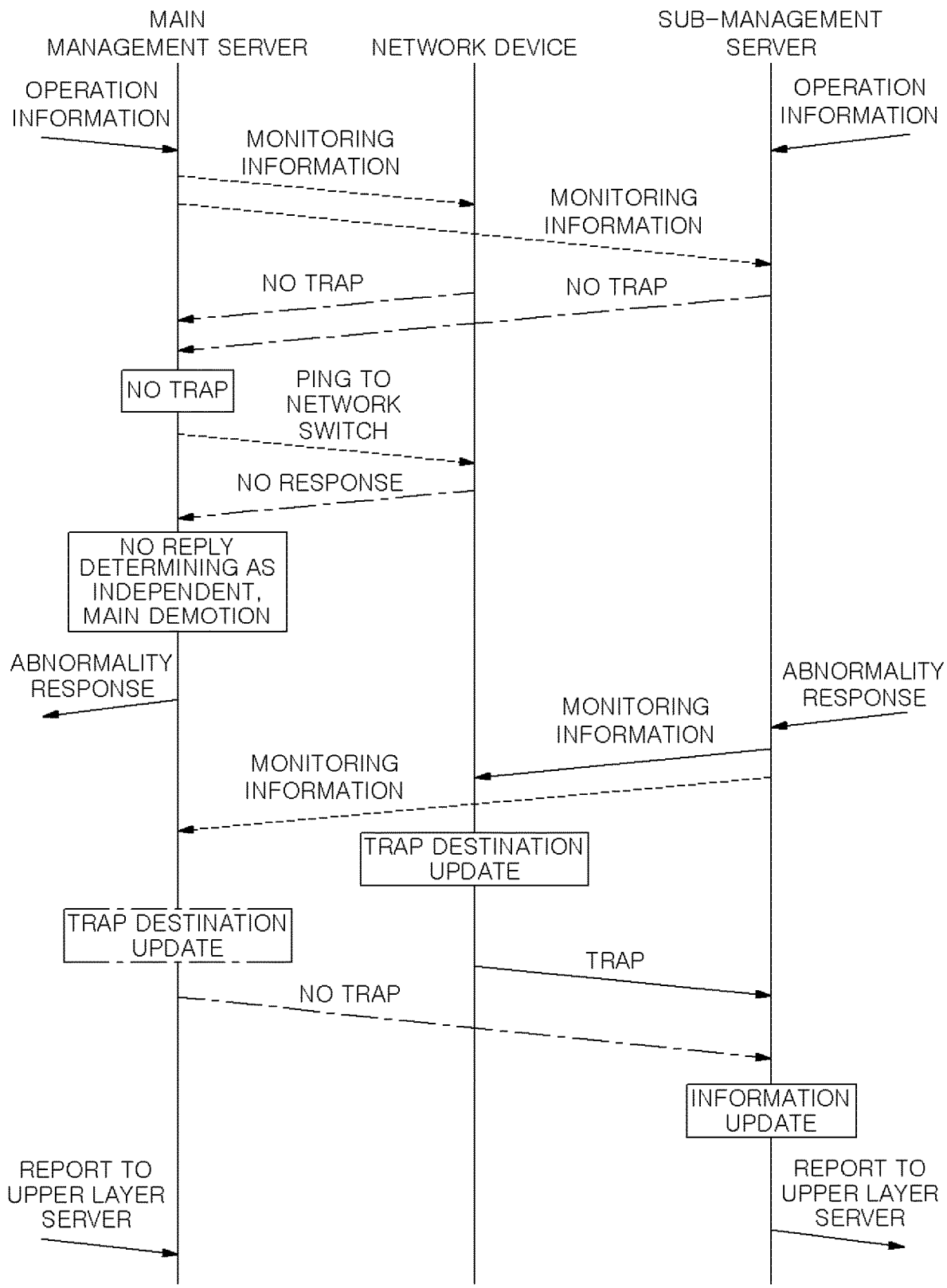
FIG. 10 shows signal exchange in the monitoring network in a state where the main management server in the monitoring network is isolated.

Hereinafter, the reconstruction of the management structure in a normal state and an abnormal state of the upper layer network and the monitoring network will be described with reference to FIGS. 3 to 10. FIGS. 3 and 4 show the communication state between the upper layer network and the monitoring network in the normal state. FIGS. 5 and 6 show the communication state between the upper layer network and the monitoring network in a state where the power of the main management server is stopped. FIGS. 7 and 8 show the communication state between the upper layer network and the monitoring network in a state where the main management server is isolated in the system. FIGS. 9 and 10 show the communication state between the upper layer network and the monitoring network in a state where the monitoring network is divided. Solid arrows indicate that an actual signal is normally transmitted and received. Dotted arrows indicate that a signal is transmitted but not received or reception of the signal is not clear. Dashed-dotted lines indicate that a signal that could have been processed or transmitted in a normal state is not processed or transmitted due to abnormality.

FIG. 3 shows the communication state of the upper layer network in the normal state. The upper layer server 1-2 transmits by multicast the operation information to the upper layer network. The main management server 1-3 collects and combines the state information and notifies the management information in the monitoring network based on the operation information. When the required process is completed, the main management server 1-3 transmits by multicast the reply to the upper layer server into the upper layer network. When the operation information is received from the upper layer server 1-2, the sub-management server 4-3 waits without performing any particular process in the monitoring network. Further, the sub-management server 4-3 waits without performing any particular process even if the reply to the upper layer server is received from the main management server 1-3.

FIG. 4 shows the communication state of the monitoring network in the normal state. When the operation information is received, the main management server 1-3 creates the management information and transmits by broadcast the management information to the monitoring network. When receiving the management information, the network devices including the sub-management server 4-3 update an IP address that is a Trap destination from the source information in the management information to the main management server 1-3 and transmit the state information thereof to the Trap destination address. When receiving Traps of all network devices, the main management server 1-3 combines and updates the state information of the network devices and multicast-transmits the reply to the upper layer server, which includes the abnormal information of the network devices, into the upper layer network. The sub-management server 4-3 waits without performing any particular process even if receiving the operation information.

FIG. 5 shows the communication state of the upper layer network in the case where the power of the main management server is stopped. The upper layer server 1-2 transmits by multicast the operation information to the upper layer network. Since the power is stopped, the main management server 1-3 cannot perform the process in the monitoring network and also cannot reply to the upper layer network. The sub-management server 4-3 determines that abnormality occurs in the main management server 1-3 when the notification (notification of the management information in the monitoring network and/or reply to the upper layer server in the upper layer network) from the main management server 1-3 is not received after the predetermined period of time elapses from the reception of the operation information. Accordingly, the sub-management server 4-3 becomes the main server instead of the main management server 1-3. The main management server 4-3 collects/combines/counts the state information and notifies the management information in the monitoring network based on the operation information. Further, the main management server 4-3 transmits by multicast the reply to the upper layer server into the upper layer network. Even if the original management server 1-3 is recovered, the main server is not changed, i.e., the management server 4-3 operates as the main server. Here, the predetermined period of time is set to be longer than the predetermined period of time (S10 in FIG. 2) that is a period of time in which the main management server waits for a reply after the transmission of the management information to the network devices.

FIG. 6 shows the communication state of the monitoring network in the case where the power of the main management server is stopped. The main management server 1-3 cannot receive and process the signal since the power is stopped. The sub-management server 4-3 determines that abnormality occurs in the main management server 1-3 when the notification from the main management server is not received for a predetermined period of time after the reception of the operation information. Accordingly, the sub-management server 4-3 becomes the main server instead of the main management server 1-3. The main management server 4-3 creates the management information based on the operation information and transmits by broadcast the management information to the monitoring network. When receiving the management information, the network devices update an IP address that is a Trap destination from the source information in the management information to the main management server 4-3 and transmit the state information thereof to the Trap destination address. When receiving Traps of all network devices, the main management server 4-3 combines and updates the state information of the network devices and multicast-transmits the reply to the upper layer server, which includes the abnormality information of the network devices, into the upper layer network.

FIG. 7 shows the communication state of the upper layer network in the case where the main management server is isolated in the upper layer network due to abnormality in the communication path or the port of the upper layer network side. The upper layer server 1-2 transmits by multicast the operation information to the upper layer network. Since the operation information from the upper layer server 1-2 is not received, the main management server 1-3 cannot perform the process in the monitoring network and also cannot reply to the upper layer network. The sub-management server 4-3 determines that abnormality has occurred in the main management server 1-3 when the notification (notification of the management information in the monitoring network and/or reply to the upper layer server in the upper layer network) from the main management server 1-3 is not received after the predetermined period of time elapses from the reception of the operation information. Accordingly, the sub-management server 4-3 becomes the main server instead of the main management server 1-3. The main management server 4-3 collects/combines/counts the state information and notifies the management information in the monitoring network based on the operation information. Further, the main management server 4-3 transmits by multicast the reply to the upper layer server into the upper layer network.

FIG. 8 shows the communication state of the monitoring network in the case where the main management server is isolated in the upper layer network due to the abnormality in the communication path or the port of the upper layer network side. Since the operation information from the upper layer server 1-2 is not received, the main management server 1-3 cannot create the management information and also cannot transmit by broadcast the management information into the monitoring network. The network devices including the sub-management server 4-3 do not receive the management information and thus there is no reply to Trap. The sub-management server 4-3 determines that abnormality has occurred in the main management server 1-3 when the notification from the main management server 1-3 is not received after the predetermined period of time elapses from the reception of the operation information. Accordingly, the sub-management server 4-3 becomes the main server instead of the main management server 1-3. The main management server 4-3 creates the management information based on the operation information and transmits by broadcast the management information into the monitoring network. When receiving the management information, the network devices including the sub-management server 1-3 update an IP address that is a Trap destination from the source information in the management information to the main management server 4-3 and transmit the state information thereof to the Trap destination address. When receiving Traps of all network devices, the main management server 4-3 combines and updates the state information of the network devices and transmits by multicast the reply to the upper layer server, which includes the abnormal information of the network devices, into the upper layer network.

FIG. 9 shows the communication state of the upper layer network in the case where the main management server is isolated in the monitoring network due to the abnormality in the communication path or the port of the monitoring network side. The upper layer server 1-2 transmits by multicast the operation information into the upper layer network. The main management server 1-3 performs the process in the monitoring network based on the operation information. Since there is no reply from the network devices, it is determined that the main management server is isolated and the reply denoting abnormality is transmitted by multicast into the upper layer network to change the main management server 1-3 to the sub-server. When the reply denoting abnormality is received from the main management server 1-3, the sub-management server 4-3 becomes the main server instead of the main management server 1-3. The main management server 4-3 collects/combines/counts the state information and notifies the management information in the monitoring network based on the operation information. Further, the main management server 4-3 transmits by multicast the reply to the upper layer server into the upper layer network.

FIG. 10 shows the communication state of the monitoring network in the case where the main management server is isolated in the monitoring network due to the abnormality in the communication path or the port of the monitoring network side. When the operation information is received, the main management server 1-3 creates the management information based on the operation information and transmits by broadcast the management information into the monitoring network. Since, however, the main management server 1-3 is isolated from the other network devices due to the abnormality in the port or the network, the management information does not reach the other network devices. When Traps are not received from the network devices including the sub-management server 4-3 for a predetermined period of time, Ping is transmitted to the network switches 1 and it is checked whether or not the communication can be performed. In this case, since there is no reply from the network switches 1, it is determined that the main management server 1-3 is isolated in the monitoring network and the change of the main server due to abnormality is notified to the upper layer network. Thus, the main management server 1-3 becomes the sub-management server 1-3. On the other hand, when the reply denoting abnormality is received from the main management server 1-3, the sub-management server 4-3 becomes the main server instead of the main management server 1-3. The main management server 4-3 creates the management information based on the operation information and transmits by broadcast the management information into the monitoring network. When the management information is received, the network devices except the sub-management server 1-3 updates an IP address that is a Trap destination from the source information in the management information to the main management server 4-3 and transmits the state information thereof to the Trap destination address. When Traps of all network devices except the sub-management server 1-3 are received, the main management server 4-3 counts and updates the state information of the network devices and transmits by multicast the reply to the upper layer server which includes the abnormality information of the network devices into the upper layer network.

Figure 11:
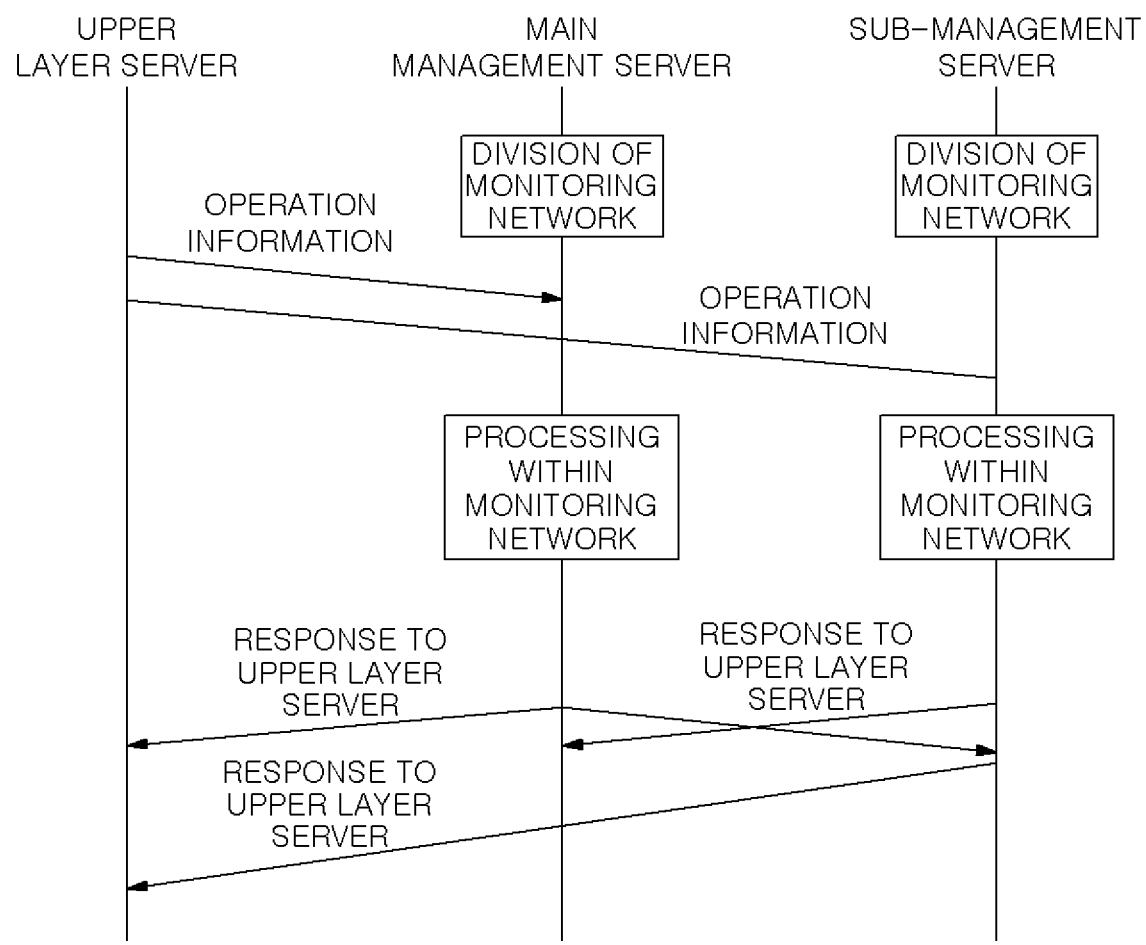
FIG. 11 shows signal exchange in the upper layer network in a state where the monitoring network is divided.

FIG. 11 shows the communication state of the upper layer network in the case where the monitoring network is divided due to the abnormality in the communication path or the network switches 1. The upper layer server 1-2 transmits by multicast the operation information into the upper layer network. The partitioning of the monitoring network is detected and recognized by the main management server 1-3 and the sub-management server 4-3, so that the main management server 1-2 and the sub-management server 4-3 Independently perform the process in the monitoring network and transmit by multicast the reply to the upper layer server into the upper layer network.

Figure 12:
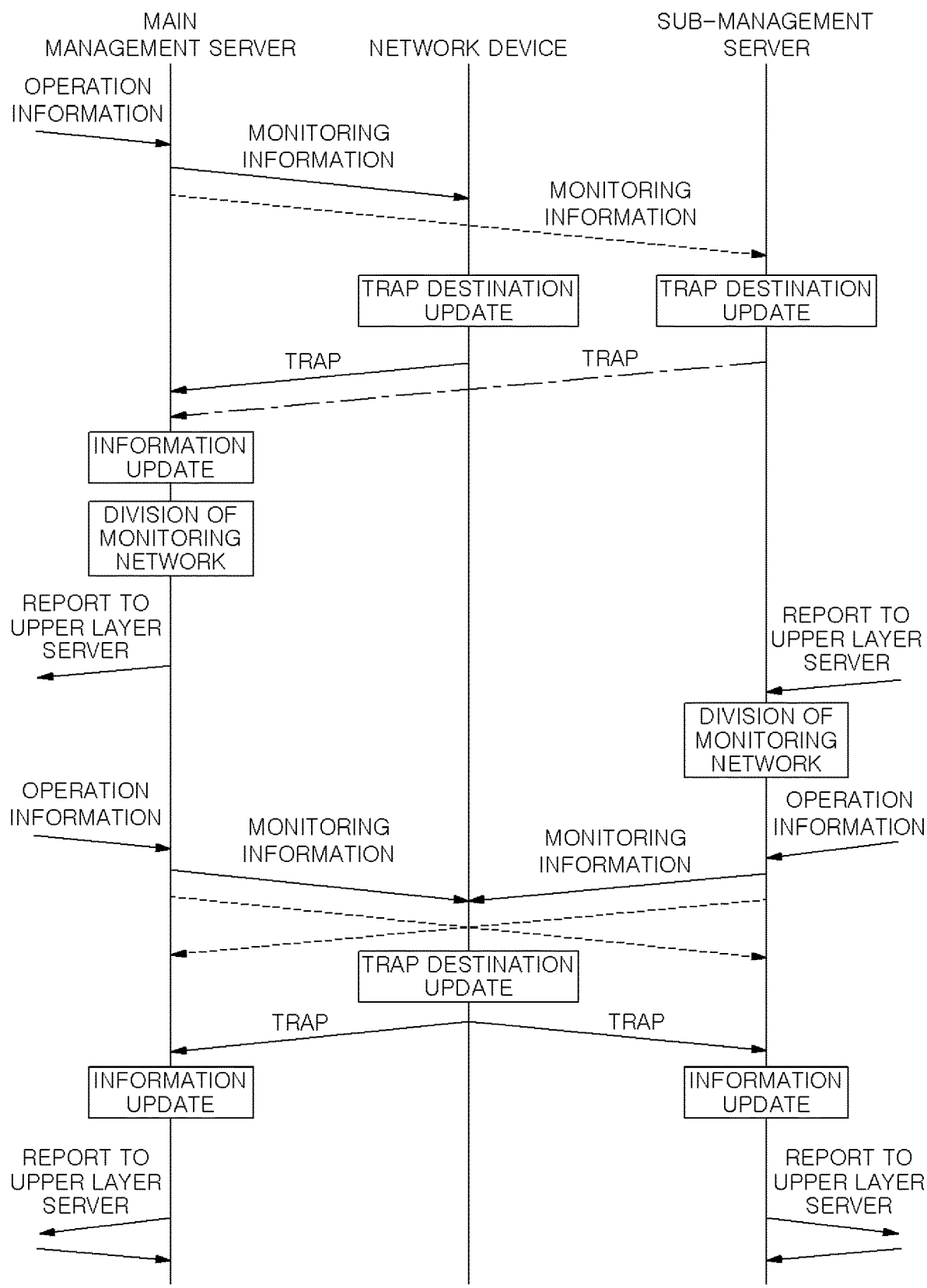
FIG. 12 shows signal exchange in the monitoring network in a state where the monitoring network is divided.

FIG. 12 shows the communication state of the monitoring network in the case where the monitoring network is divided due to abnormality in the communication or the network switches 1. When the operation information is received, the main management server 1-3 creates the management information based on the operation information and transmits by broadcast the management information into the monitoring network. Since the monitoring network is divided, the management information reaches the network devices in the divided monitoring network including the main management server 1-3 but does not reach the network devices in the divided monitoring network which does not include the main management server 1-3. The network devices that have received the management information update an IP address that is a Trap destination from the source information in the management information to the main management server 4-3 and transmit the state information thereof to the Trap destination address. The network devices that have not received the management information which includes the sub-management server 4-3 cannot reply to Trap. When Traps of a part of the network devices are received and Traps of the other network devices are not received, the main management server 4-3 counts and updates the state information of the network devices that have received Traps, updates the state of the network devices that have not received Traps to "no reply to Trap", and determines that the network is divided. At this time, Ping may be transmitted to the respective network switches 1 for reconfirmation. When the partitioning of the network is detected, the reply to the upper layer server which denotes the partitioning of the monitoring network is transmitted by multicast to the upper layer network. When the reply denoting the partitioning of the monitoring network is received, the sub-management server 4-3 completes the function of the main server in order to control the divided monitoring network including the sub-management server 4-3. In other words, the sub-management server 4-3 performs the function of the main management server 103 until the partitioning of the monitoring network is recovered. Therefore, when the operation information is received, the main management server 1-3 and the sub-management server 4-3 create the management information and transmit by broadcast the management information into the monitoring network. The network devices in the divided monitoring network which includes the main management server 1-3 receive the management information from the main management server 1-3, update an IP address that is a Trap destination from the source information in the management information to the main management server 1-3, and transmit the state information thereof to the main management server 1-3 that is the Trap destination address. On the other hand, the network devices in the divided monitoring network which includes the sub-management server 4-3 receive the management information from the sub-management server 4-3, update an IP address that is a Trap destination from the source information in the management information to the sub-management server 4-3, and transmit the state information thereof to the sub-management server 4-3 that is the Trap destination address. When Traps of the network devices are received, the main management server 1-3 and the sub-management server 4-3 count and update the state information of the network devices and transmit by multicast the reply to the upper layer server into the upper layer network.

When the partitioning of the network is recovered, the main management server 1-3 and the sub-management server 4-3 transmit by broadcast the management information into the monitoring network. Since the management information from the main management server 1-3 reaches the sub-management server 4-3, the sub-management server 4-3 determines that the partitioning of the network has been recovered and does not reply to the upper layer server even if Traps return from the respective network devices. On the other hand, the main management server 1-3 receives Traps from the network devices, combines and updates the state information, and broadcast-transmits the reply to the upper layer server into the upper layer network.

The sub-management server 4-3 does not become a main server because after the partitioning of the monitoring network is recovered, the main management server 1-3 operates as the main server and the sub-management server 4-3 naturally returns to the sub-server.

The network switch has a function of short-circuiting a port when abnormality occurs or power is stopped. However, in the case of using such a network switch, there is no reply of Trap from network devices of only a specific vehicle. In that case, the main management server 1-3 transmits by multicast the reply to the upper layer server which denotes no reply of Trap from a specific vehicle into the upper layer network.

As described above, in the first embodiment, the unified system management can be performed regardless of types of combination of vehicles and, also, the monitoring system can continuously operate without stop even when abnormality occurs in the network devices or in the network. As a result, a stable and highly reliable operation of the railway vehicle can be supported.

Second Embodiment

Hereinafter, reconstruction of the monitoring network and setting of the management structure in the case of newly connecting trains in the second embodiment will be described with reference to FIGS. 13A, 13B, 14A and 14B.

Figure 13A:
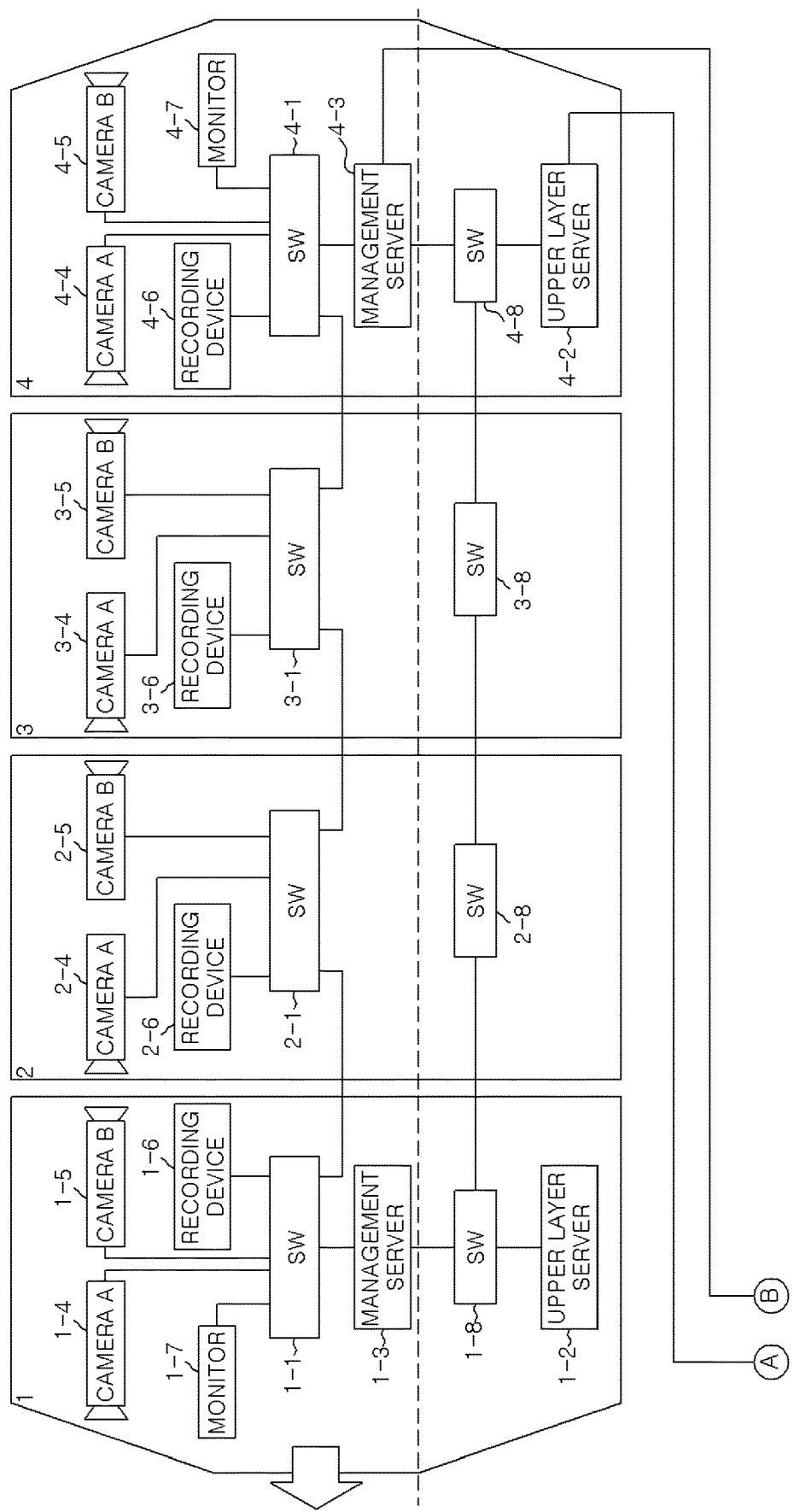
FIGS. 13A and 13B show an exemplary configuration of an intra-formation network according to a second embodiment in the case of connecting vehicles.
Figure 13B:
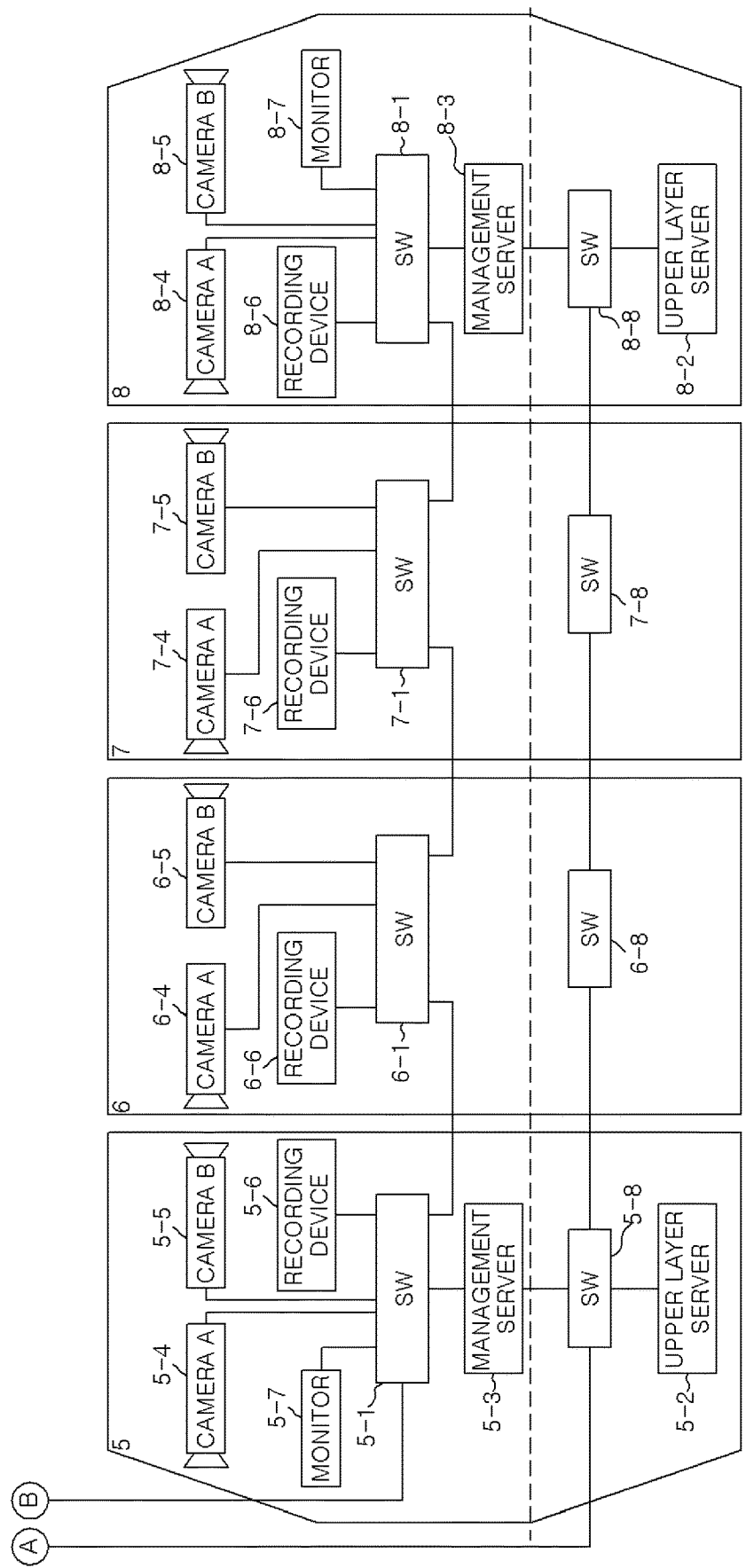
Figure 14A:
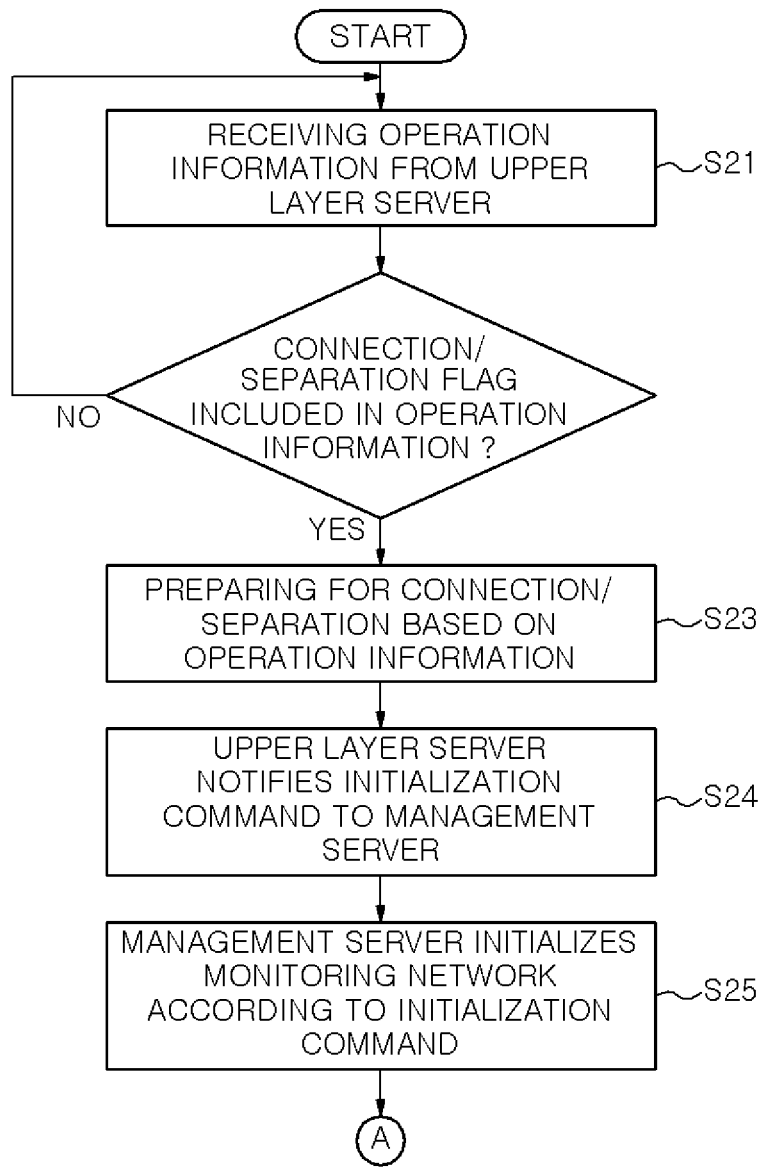
FIGS. 14A and 14B are an exemplary flowchart showing a management method of an intra-formation monitoring network in the case of connecting vehicles.
Figure 14B:
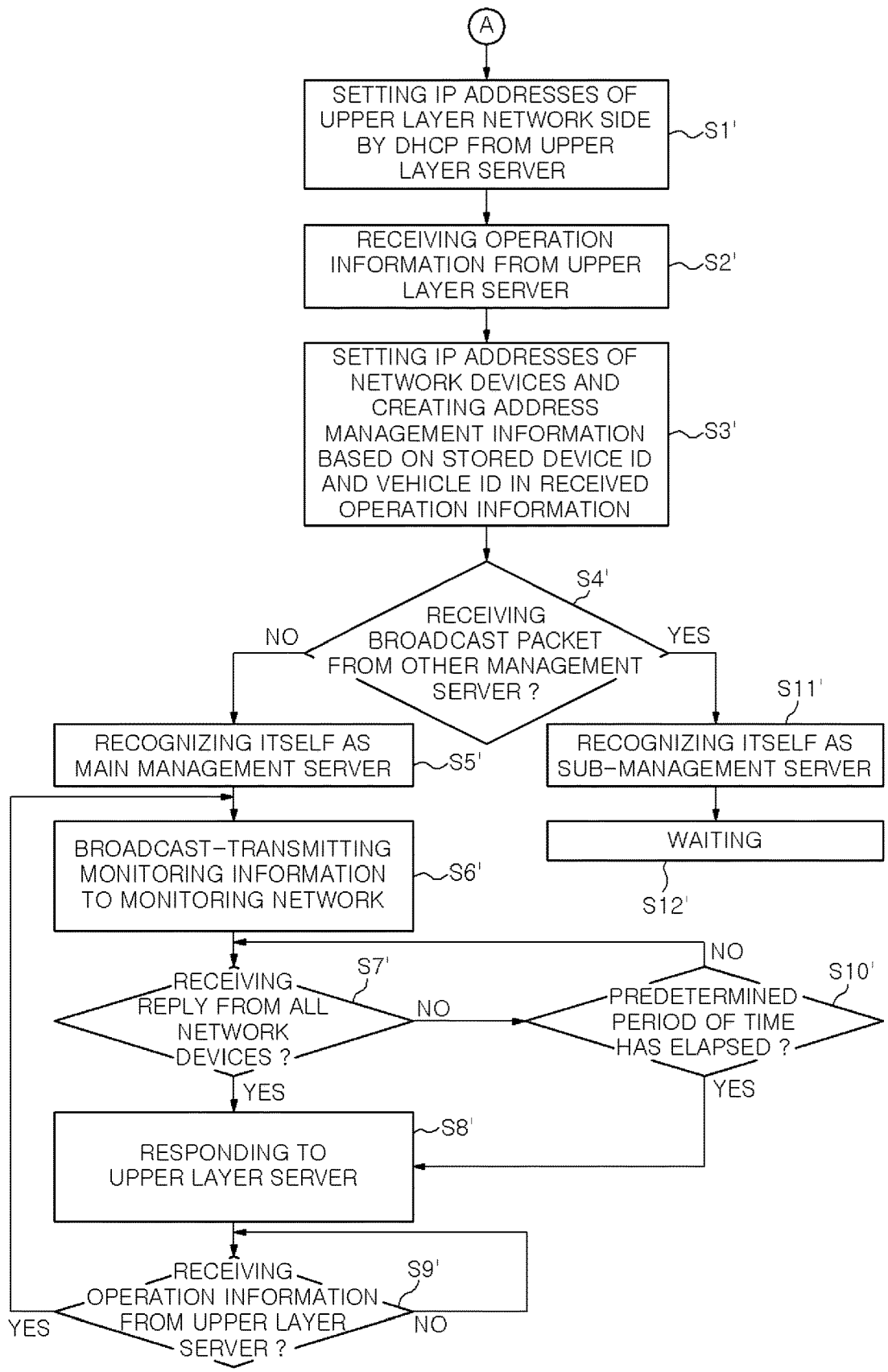

FIGS. 13A and 13B show an exemplary configuration of the intra-formation network according to the second embodiment in the case of connecting vehicles. In this embodiment, vehicles 5 to 8 having the same configurations as those of the vehicles 1 to 4 in the first embodiment are connected to each other. In the upper layer network, a network switch 4-8 of the vehicle 4 is connected to a network switch 5-8 of the vehicle 5. In the monitoring network, a network switch 4-1 of the vehicle 4 is connected to a network switch 5-1 of the vehicle 5. The configurations of the network devices in each vehicle are the same as those of the first embodiment, so that the redundant description thereof will be omitted. In the second embodiment as well, an arrow direction in FIGS. 13A and 13B is set to a travelling direction.

Reference numerals 5-1 to 8-1 denote network switches for connecting monitoring networks, the network switched being connected to network devices. Reference numerals 5-2 and 8-2 denote upper layer servers for managing an operation of a train. Reference numerals 5-3 and 8-3 denote management servers for controlling the network devices in the train formation. Reference numerals 5-4 to 8-4 denote cameras A for capturing images near a right door in the travelling direction of the vehicle. Reference numerals 5-5 to 8-5 denote cameras B for capturing images near a left door in the traveling direction of the vehicle. Reference numerals 5-6 to 8-6 denote recording devices for recording the images captured by the cameras of the respective vehicles. Reference numerals 5-7 and 8-7 denote monitors for displaying images in the train formation or the like. Reference numerals 5-8 to 8-8 denote network switches for connecting upper layer networks.

Especially, the vehicles 5 and 8 having driver cabins include the network switches 5-1 and 8-4, the upper layer servers 5-2 and 8-2, the management servers 5-3 and 8-3, the cameras A(5-4) and A(8-4), the cameras B(5-5) and B(8-5), the recording devices 5-6 and 8-6, the monitors 5-7 and 8-7, and the network switches 5-8 and 8-8, respectively. In the monitoring network, the network devices are connected through the network switches 5-1 and 8-1. The vehicles 6 and 7 without driver cabins include the network switches 6-1 and 7-1, the cameras A(6-4) and A(7-4), the cameras B(6-5) and B(7-5), the recording devices 6-6 and 7-6, and the network switches 6-8 and 7-8, respectively. The network devices are connected to the network such as LAN or the like through the network switches 6-1 and 7-1. The monitoring network including the vehicles 1 to 8 is constructed by connecting the network switches 1 between adjacent vehicles, e.g., the network switch 4-1 of the vehicle 4 and the network switch 5-1 of the vehicle 5. Further, the upper layer network including vehicles 1 to 8 is constructed by connecting the network switches 8 between adjacent vehicles, e.g., the network switch 4-8 of the vehicle 4 and the network switch 5-8 of the vehicle 5. One of the upper layer servers 2 and one of the management servers 3 respectively installed in the vehicles 1, 4, 5 and 8 serve as main servers and the others serve as sub-servers. Basically, the main servers control and manage the network devices and the sub-servers do not control the devices. The main management server 3 is determined in various manners. In the present embodiment, the server having a smallest IP address assigned by the upper layer server 2 and a highest processing speed serves as the main management server. In the present embodiment, the upper layer server 1-2 and the management server 1-3 serve as the main servers.

In the present embodiment as well as the first embodiment, the network including the cameras above the dotted line is set to the monitoring network and the network including the upper layer server below the dotted line is set to the upper layer network. The upper layer network is for the entire system of the railway vehicle and the monitoring network is for the monitoring system using the images of the railway vehicle. The upper layer network and the monitoring network are divided by a subnet mask and connected through the management server. In other words, the management server 3 has a port of the monitoring network side and a port of the upper layer network side and manages both networks separately by a VLAN. The communication between the upper layer network and the monitoring network is performed by the management servers 3. The upper layer network is connected to devices mainly for a vehicle operation (not shown) including the upper layer server 2 and the management server 3. The monitoring network is connected to image monitoring devices including the management server 3, the network switch 1, the cameras A(4) and B(5), the recording device 6, and the monitor 7.

Hereinafter, the construction of the intra-formation network of the monitoring system and the setting of the management structure in the case of connecting vehicles of a train will be described with reference to FIG. 12.

During the operation of the train, the upper layer server 1-2 transmits by multicast the operation information to the management servers 1-3 and the sub-management server 4-3 at a regular interval (S21). The main management server 1-3 checks whether or not a connection flag exists in the received operation information (S22). If the connection flag does not exist in the operation information (No), the main management server 1-3 waits for the reception of next operation information and the process proceeds to S21. On the other hand, if the connection flag exists in the operation information (Yes), the process proceeds to S23 and the main management server 1-3 prepares for the connection of vehicles depending on the connection flag (S23). When the vehicles are connected, the regular notification of the operation information from the upper layer server 1-2 is stopped. During the preparation, the main management server 1-3 and the sub-management server 4-3 do not determine the state in which the notification of the operation information is stopped as an abnormal state. The upper layer server 1-2 notifies the main management server 1-3 of an initialization command of the monitoring network (S24). The main management server 1-3 releases (deletes) the IP addresses of the network devices of the monitoring network in response to the initialization command and initializes the address management information (S25). At this time, the setting of the main management server 3 and the sub-management server 3 is released.

When the connection of the vehicles is completed, the upper layer network starts preparation of the devices for the operation. At this time, the upper layer server 1-2 assigns ID addresses of the upper layer network side to the management server 1-3, 4-3, 5-3 and 8-3 by using DHCP (S1'). Next, the upper layer server 1-2 notifies the management servers 1-3, 4-3, 5-3 and 8-3 of the operation information (S2').

The management servers 1-3, 4-3, 5-3 and 8-3 analyze a vehicle ID in the received operation information based on the previously stored information of the vehicle ID, obtain ID addresses of the network devices while referring to the previously stored information of devices on a vehicle type basis, and create an address management table that is a management table of the network devices (S3').

The management server 1-3, 4-3, 5-3 and 8-3 determine whether or not the management information has been received by broadcast from the other management server 3 (S4'). When the management information has not been received (No), the management servers 1-3, 4-3, 5-3 and 8-4 are recognized as main management servers (S5') and the management information created based on the operation information is transmitted by broadcast to the monitoring network (S6'). On the contrary, when the management information has been received (Yes), the management servers 1-3, 4-3, 5-3 and 8-3 are recognized as sub-management servers (S11') and made to wait (S12').

Upon completion of the setting of the IP addresses of the network devices, the management servers 1-3, 4-3, 5-3 and 8-3 transmit by broadcast the management information packet including the IP addresses thereof to the network devices of the monitoring network (S6'). In the present embodiment, the management server 1-3 having a low IP address and a highest processing speed transmits by broadcast the management information, so that the management server 1-3 serves as a main server and the management server 4-3, 5-3 and 8-3 serve as sub-servers.

The main management server 1-3 determines whether or not the reply has been received from all the network devices (S7'). When the reply has been received from all the network devices (Yes), the main management server 1-3 transmits by multicast the state information of the network devices to the upper layer server 1-2 (S8'). Then, the main management server 1-3 determines whether or not the operation information has been received from the upper layer server (S9'). When the operation information has been received (Yes), the process proceeds to S6'. When the operation information has not been received (No), S9' is repeated until the operation information is received. When it is determined in S7' that the reply has not been received from all the network devices (No), the process proceeds to S10' to determine whether or not a predetermined period of time has elapsed (S10'). When the predetermined period of time has elapsed (Yes), it is considered that there is no reply and the process proceeds to S8' to reply to the upper layer server 1-2. When the predetermined period of time has not elapsed (No), the process proceeds to S7' and the reply from an unresponsive network device is waited.

Accordingly, the network devices in the train formation can communicate in the monitoring network. When the state in which the communication can be performed is ensured in the monitoring network, the management server 1-3 notifies the upper layer server 1-2 of the corresponding state. Further, when the preparation of the system in the train other than the monitoring network is completed, the operation of the train is started (operation).

When the vehicles are separated, the connection flag of the present embodiment is replaced by the separation flag. When the vehicles are separated and connected, both of the connection flag and the separation flag are notified. In the present embodiment, the connection flag and the separation flag are distinguished. However, the connection flag and the separation flag may not be distinguished and may be notified as vehicle re-formation flags.

The above series of processes are different from those of the first embodiment in that the vehicle connection processes from S11 to S15 are added and the number of network devices to be managed is increased as many as the number of connected vehicles. The other processes from S1' to S12' are basically the same as those of the first embodiment.

The communication methods of the upper layer network and the monitoring network in a normal state and in an abnormal state of the first embodiment which have been described with reference to FIGS. 3 to 12 are applicable to the second embodiment. In the second embodiment, four management servers are installed in the train formation. However, when the main management server and the sub-management server are changed, one of three sub-management servers which has a smallest IP address and a highest processing speed becomes the main management server.

When the monitoring network is divided into two, the following three cases (a) to (c) may exist. The monitoring network is divided into (a) a monitoring network of a single main management server and monitoring networks of three sub-management servers; (b) monitoring networks of a single main management server and a single sub-management server and monitoring networks of two sub-management servers; and (c) monitoring networks of a single main management server and two sub-management servers and a monitoring network of a single sub-management server. In the case of (a) and (b), the main management server operates as the main server and a sub-management server having a low IP address and a highest processing speed in one monitoring network serves as the main server. In the case of (c), the main management server operates as the main server and a single sub-management server in one monitoring network serves as the main server.

When the monitoring network is divided into three, the main management server operates as the main server and a single one sub-management server in the divided monitoring network serves as the main server. If there is a plurality of sub-management servers, a sub-management server having a smallest IP address and a highest processing speed serves as the main server. When the monitoring network is divided into a plurality of networks which does not include the management server, the monitoring network which does not include the management server needs to be separated.

As described above, in the present embodiment, when the network is reconstructed by connection or separation of the vehicles, the monitoring network can be quickly reconstructed and the unified system management can be performed. As a consequence, the operation of the railway vehicle can be quickly restarted.

The configuration of the system, the apparatus or the like of the present invention may be variously modified without being limited to the above-described one. Further, the present invention may be provided as a method for performing the processes of the present invention, a program for realizing the method, a storage medium for storing the program, or various systems or apparatuses. The present invention can be applied to various fields other than the above-described filed.

For example, in the first and the second embodiment, the train formation includes four vehicles. However, the number of vehicles is not limited to four. In addition, different train formations including different number of vehicles may be connected. The processes are not changed even if the number of vehicles is changed.

In the present invention, the cameras capture images near the door. However, the cameras may capture images of a deck, the inside of the passenger cabin, or the outside of the vehicle. The images may be recorded or displayed constantly or in response to selection of an operator such as a driver or the like. In the above, for convenience of description, two cameras are provided for one vehicle. However, the number of cameras may be one or more than three. The number of the recording devices or the monitors is not particularly limited. Devices other than the aforementioned devices may also be installed.

The sub-management server having a smallest IP address and a highest processing speed was selected in the case of selecting a management server, selecting a management server that will become a main server among sub-management servers, or selecting a sub-management server to serve as the main server among the sub-management servers. However, the management server of the leading vehicle or the management server closest to the leading vehicle may be selected based on the operation information. Or, the management server having a smallest management number may be selected. Any other type of selection may be used as long as a corresponding server can be determined without uniquely.

In the present invention, the main management server or the sub-management server serving as the main server transmits by broadcast or multicast the management information into the monitoring network.

INDUSTRIAL APPLICABILITY

The present invention can be applied to a railway vehicle and also can be effectively applied to a system in which a plurality of predetermined unit systems including network devices is connected or separated.

DESCRIPTION OF REFERENCE NUMERALS 1, 2, 3, 4, 5, 6, 7, 8: vehicle
1-1, 2-1, 3-1, 4-1, 5-1, 6-1, 7-1, 8-1: network switch
1-2, 4-2, 5-2, 8-2: upper layer server
1-3, 4-3, 5-3, 8-3: management server
1-4, 2-4, 3-4, 4-4, 5-4, 6-4, 7-4, 8-4: camera A
1-5, 2-5, 3-5, 4-5, 5-5, 6-5, 7-5, 8-5: camera B
1-6, 2-6, 3-6, 4-6, 5-6, 6-6, 7-6, 8-6: recording device
1-7, 4-7, 5-7, 8-7: monitor
1-8, 2-8, 3-8, 4-8, 5-8, 6-8, 7-8, 8-8: network switch

What is claimed is:

1. An intra-formation network system of a train formation including one or more vehicles, comprising:
   network devices;
   at least one management apparatus connected to the network devices through an intra-formation network and configured to control the network devices; and
   at least one upper layer server configured to operate the train formation,
   wherein the intra-formation network comprises:
   an upper layer network including the at least one upper layer server; and
   a lower layer network including the network devices and the at least one management apparatus,
   wherein the upper layer network is a network for an entire system of a train, the lower layer network is a network for a monitoring system and the upper layer network and the lower layer network are connected via the at least one management apparatus,
   in the upper layer network, the at least one upper layer server communicates with the at least one management apparatus by multicast,
   in the lower layer network, the at least one management apparatus communicates with the network devices by broadcast,
   when the train is activated, one of the at least one upper layer server notifies the at least one management apparatus of operation information as first information by multicast,
   the at least one management apparatus obtains the first information and determines whether or not the at least one management apparatus itself is a main management apparatus based on the first information,
   a management apparatus determined as the main management apparatus transmits management information generated based on the first information to the lower layer network by broadcast and, when a state in which the main management apparatus is communicable with the network devices is ensured in the lower layer network, the main management apparatus notifies the one of the at least one upper layer server of the state, each of the vehicles includes at least one of the network devices, and at least one of the one or more vehicles includes one of the at least one upper layer server of the upper layer network and one of the at least one management apparatus of the lower layer network.

2. The intra-formation network system of claim 1, wherein the network devices transmit state information thereof to the at least one management apparatus, and when receiving the state information of the network devices, the at least one management apparatus combines the state information of the network devices and transmits the combined state information as second information to the upper layer network.

3. The intra-formation network system of claim 1, wherein the main management apparatus transmits the management information required for operations of the network devices to the network devices.

4. The intra-formation network system of claim 3, wherein the at least one management apparatus determines whether or not the at least one management apparatus has received the management information from another management apparatus after the intra-formation network system is activated, wherein when the at least one management apparatus has not received the management information, the at least one management apparatus controls the network devices as the main management apparatus.

5. The intra-formation network system of claim 2, wherein when the at least one management apparatus includes two or more management apparatuses, a management apparatus other than the main management apparatus serves as a sub-management apparatus, wherein when the second information to be transmitted from the main management apparatus to the sub-management apparatus is not received for a predetermined period of time or when information indicating abnormality of the main management apparatus is included in the second information transmitted from the main management apparatus to the sub-management apparatus, the sub-management apparatus and the main management apparatus switch their roles so that the sub-management apparatus becomes to serve as the main management apparatus and the main management apparatus becomes to serve as the sub-management apparatus.

6. The intra-formation network system of claim 2, wherein when the at least one management apparatus includes two or more management apparatuses, a management apparatus other than the main management apparatus serves as a sub-management apparatus, wherein when the second information transmitted from the main management apparatus to the sub-management apparatus includes information indicating that some of the network devices transmit the state information and remaining devices of the network devices do not transmit the state information, the sub-management apparatus changes its role so that the sub-management apparatus becomes to serve as the main management apparatus.

7. An intra-formation network management method in an intra-formation network system of a train formation including one or more vehicles, the intra-formation network system including network devices, at least one management apparatus configured to manage the network devices through an intra-formation network and at least one upper layer server configured to operate the train formation, the intra-formation network comprising an upper layer network including the at least one upper layer server and a lower layer network including the network devices and the at least one management apparatus, in which method:

the upper layer network is a network for an entire system of a train, the lower layer network is a network for a monitoring system and the upper layer network and the lower layer network are connected via the at least one management apparatus, in the upper layer network, the at least one upper layer server communicates with the at least one management apparatus by multicast, in the lower layer network, the at least one management apparatus communicates with the network devices by broadcast, when the train is activated, one of the at least one upper layer server notifies the at least one management apparatus of operation information as first information by multicast, the at least one management apparatus obtains the first information and determines whether or not the at least one management apparatus itself is a main management apparatus based on the first information, a management apparatus determined as the main management apparatus transmits management information generated based on the first information to the lower layer network by broadcast and, when a state in which the main management apparatus is communicable with the network devices is ensured in the lower layer network, the main management apparatus notifies the one of the at least one upper layer server of the state, each of the vehicles includes at least one of the network devices, and at least one of the one or more vehicles includes one of the at least one upper layer server of the upper layer network and one of the at least one management apparatus of the lower layer network.

8. The intra-formation network management method of claim 7, wherein the network devices transmit state information thereof to the at least one management apparatus, and when receiving the state information of the network devices, the at least one management apparatus combines the state information of the network devices and transmits the combined information as second information to the upper layer network.

9. The intra-formation network management method of claim 7, wherein the main management apparatus transmits the management information required for operations of the network devices to the network devices.

10. The intra-formation network management method of claim 9, wherein the at least one management apparatus determines whether or not the at least one management apparatus has received the management information from another management apparatus after the intra-formation network system is activated, and wherein when the at least one management apparatus has not received the management information, the at least one management apparatus controls the network devices as the main management apparatus.

11. The intra-formation network management method of claim 8, wherein when the at least one management apparatus includes two or more management apparatuses, a management apparatus other than the main management apparatus serves as a sub-management apparatus, and wherein when the second information to be transmitted from the main management apparatus to the sub-management apparatus is not received for a predetermined period of time or when information indicating abnormality of the main management apparatus is included in the second information transmitted from the main management apparatus to the sub-management apparatus, the sub-management apparatus and the main management apparatus switch their roles so that the sub-management apparatus becomes to serve as the main management apparatus and the main management apparatus becomes to serve as the sub-management apparatus.

12. The intra-formation network management method of claim 8, wherein when the at least one management apparatus includes two or more management apparatuses, a management apparatus other than the main management apparatus serves as a sub-management apparatus, and
wherein when the second information transmitted from the main management apparatus to the sub-management apparatus includes information indicating that some of the network devices transmit the state information and remaining devices of the network devices do not transmit the state information, the sub-management apparatus changes its role so that the sub-management apparatus becomes to serve as the main management apparatus.

13. A management apparatus for managing network devices installed in an intra-formation network system of a train formation including one or more vehicles, each of the vehicles including at least one of the network devices, wherein:
the management apparatus is connected to an upper layer network including at least one upper layer server configured to operate the train formation, wherein the upper layer network is a network for an entire system of a train and the management apparatus communicates with the at least one upper layer server by multicast in the upper layer network,
the management apparatus is included in a lower layer network including the network devices, wherein the lower layer network is a network for a monitoring system and the management apparatus communicates with the network devices by broadcast in the lower layer network,
the upper layer network and the lower layer network are connected via the management apparatus,
when the train is activated, the management apparatus is notified by one of the at least one upper layer server of operation information as first information by multicast,
the management apparatus obtains the first information and determines whether or not the management apparatus itself is a main management apparatus based on the first information,
when the management apparatus is determined as the main management apparatus, the main management apparatus transmits management information generated based on the first information to the lower layer network by broadcast and, when a state in which the main management apparatus is communicable with the network devices is ensured in the lower layer network, the main management apparatus notifies the one of the at least one upper layer server of the state, and
wherein the management apparatus of the lower layer network is included in one of the one or more vehicles including one of the at least one upper layer server of the upper layer network.

14. The management apparatus of claim 13, wherein the management apparatus transmits the management information required for operations of the network devices to the network devices when it is determined as the main management apparatus.

15. The management apparatus of claim 14, wherein the management apparatus determines whether or not the management apparatus has received the management information from another management apparatus after the intra-formation network system is activated, and
wherein when the management apparatus has not received the management information, the management apparatus controls the network devices as the main management apparatus.

16. The management apparatus of claim 14, wherein the management apparatus serves as a sub-management apparatus when it is not determined as the main management apparatus, and
wherein when the management apparatus does not receive second information including the state information of the network devices to be transmitted from the main management apparatus within a predetermined period of time or receives information, which is included in the second information transmitted from the main management apparatus, indicating abnormality of the main management apparatus, the sub-management apparatus changes its role to serve as the main management apparatus.

17. The management apparatus of claim 14, wherein the management apparatus serves as a sub-management apparatus when it is not determined as the main management apparatus, and
wherein when the sub-management apparatus receives second information including the state information of the network devices transmitted from the main management apparatus to the sub-management apparatus, the second information including information indicating that some of the network devices transmit the state information and remaining devices of the network devices do not transmit the state information, the sub-management apparatus changes its role to serve as the main management apparatus.

18. The intra-formation network system of claim 1, wherein the intra-formation network system includes two or more vehicles.

19. The intra-formation network management method of claim 7, wherein the intra-formation network system includes two or more vehicles.

20. The management apparatus of claim 13, wherein the intra-formation network system includes two or more vehicles.

* * * * *